United States Patent
Andrisevic et al.

(10) Patent No.: US 12,344,520 B2
(45) Date of Patent: Jul. 1, 2025

(54) QUICK RELEASE BEVERAGE DISPENSER WITH KEYED COUPLER

(71) Applicants: Nicholas Mason Andrisevic, Edina, MN (US); Peter Nicholas Benecke, Eden Prairie, MN (US)

(72) Inventors: Nicholas Mason Andrisevic, Edina, MN (US); Peter Nicholas Benecke, Eden Prairie, MN (US)

( * ) Notice: Subject to any disclaimer, the term of this patent is extended or adjusted under 35 U.S.C. 154(b) by 652 days.

(21) Appl. No.: 17/232,875

(22) Filed: Apr. 16, 2021

(65) Prior Publication Data

US 2021/0323806 A1    Oct. 21, 2021

Related U.S. Application Data

(60) Provisional application No. 63/068,726, filed on Aug. 21, 2020, provisional application No. 63/012,115, filed on Apr. 18, 2020.

(51) Int. Cl.
*B67D 1/14*    (2006.01)
*F16K 31/60*    (2006.01)

(52) U.S. Cl.
CPC .......... *B67D 1/1477* (2013.01); *F16K 31/602* (2013.01)

(58) Field of Classification Search
CPC ........ B67D 1/1477; B67D 3/04; B67D 3/043; B67D 3/044; B67D 3/047; B67D 1/0872; B67D 1/1405; B67D 3/045; F16K 31/602; F16K 31/60; F16K 31/605; F16K 31/607; F16K 35/00; F16K 35/02; F16K 35/022; F16K 35/025; F16K 35/027; F16L 37/22; F16L 37/23; G05G 1/04; G05G 1/06; G05G 5/06; G05G 5/065; G05G 5/08

USPC ............ 74/548; 251/231, 235, 90; 222/191; 285/276

See application file for complete search history.

(56) References Cited

U.S. PATENT DOCUMENTS

| | | | | |
|---|---|---|---|---|
| 2,498,835 A | * | 2/1950 | Brotman | D06F 34/30 74/504 |
| 2,809,658 A | * | 10/1957 | Frantz | F16K 35/06 251/117 |
| 4,876,766 A | * | 10/1989 | Cohen | F16K 31/602 403/17 |
| 5,438,730 A | * | 8/1995 | Hansen, III | F16K 31/60 16/422 |
| 5,975,489 A | | 11/1999 | deCler et al. | |
| 6,082,401 A | | 7/2000 | Braun et al. | |
| 8,276,879 B2 | | 10/2012 | Erickson et al. | |
| 8,360,404 B2 | | 1/2013 | Motley et al. | |

(Continued)

FOREIGN PATENT DOCUMENTS

| | | |
|---|---|---|
| JP | 2010-148593 A | 7/2010 |
| WO | 2016/128717 A1 | 8/2016 |

*Primary Examiner* — Kenneth Rinehart
*Assistant Examiner* — Jonathan J Waddy
(74) *Attorney, Agent, or Firm* — Dykema Gossett PLLC

(57) ABSTRACT

Various embodiments of the present disclosure include a beverage dispenser. The beverage dispenser can include a tap handle. In some embodiments, the beverage dispenser can include a faucet that includes a faucet lever. In some embodiments, the beverage dispenser can include the tap handle is configured to be coupled to the faucet lever via a quick release keyed coupler. In some embodiments, the quick release keyed coupler is configured to prevent rotation of the tap handle with respect to the faucet.

16 Claims, 23 Drawing Sheets

(56) References Cited

U.S. PATENT DOCUMENTS

| | | | | |
|---|---|---|---|---|
| 9,803,776 | B2* | 10/2017 | Akamoto | F16K 35/02 |
| 2002/0108651 | A1* | 8/2002 | Becker | B67D 1/1405 |
| | | | | 137/375 |
| 2008/0230732 | A1* | 9/2008 | Erickson | F16K 31/60 |
| | | | | 251/231 |
| 2008/0232090 | A1* | 9/2008 | Hecht | B67D 1/1477 |
| | | | | 362/96 |
| 2010/0213399 | A1* | 8/2010 | Yan | F16K 31/60 |
| | | | | 251/235 |
| 2010/0224273 | A1* | 9/2010 | Motley | B67D 1/1405 |
| | | | | 251/231 |
| 2017/0283237 | A1* | 10/2017 | Pound | B67D 1/1477 |

* cited by examiner

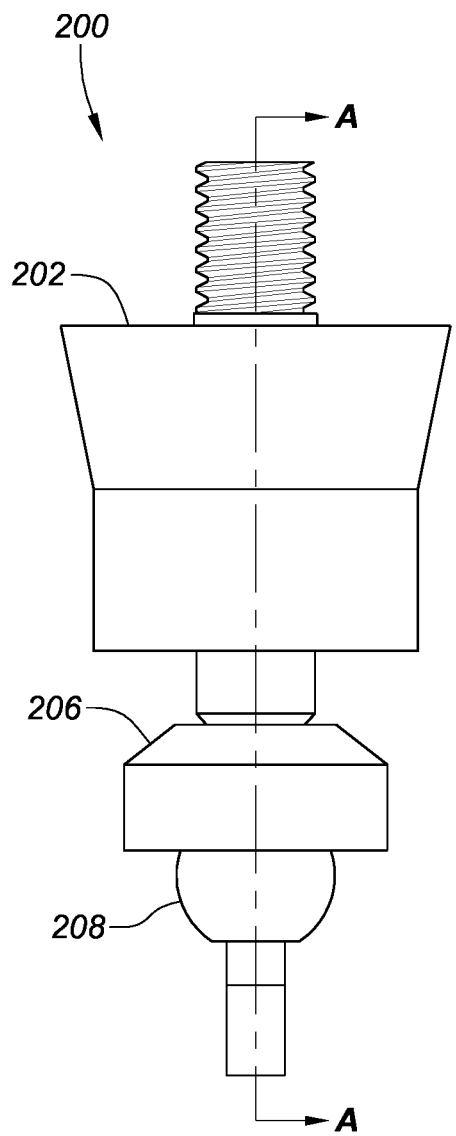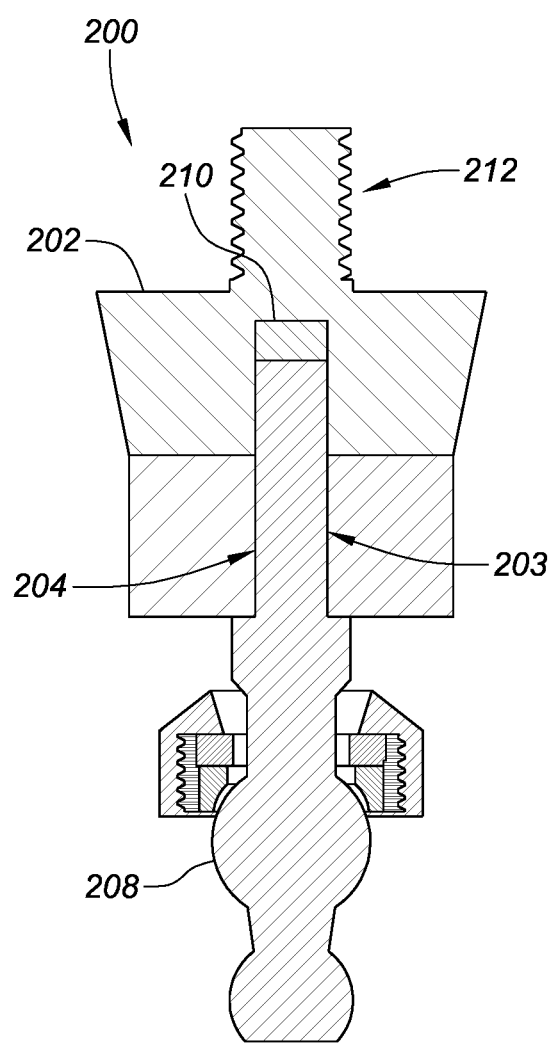
FIG. 8A  FIG. 8B

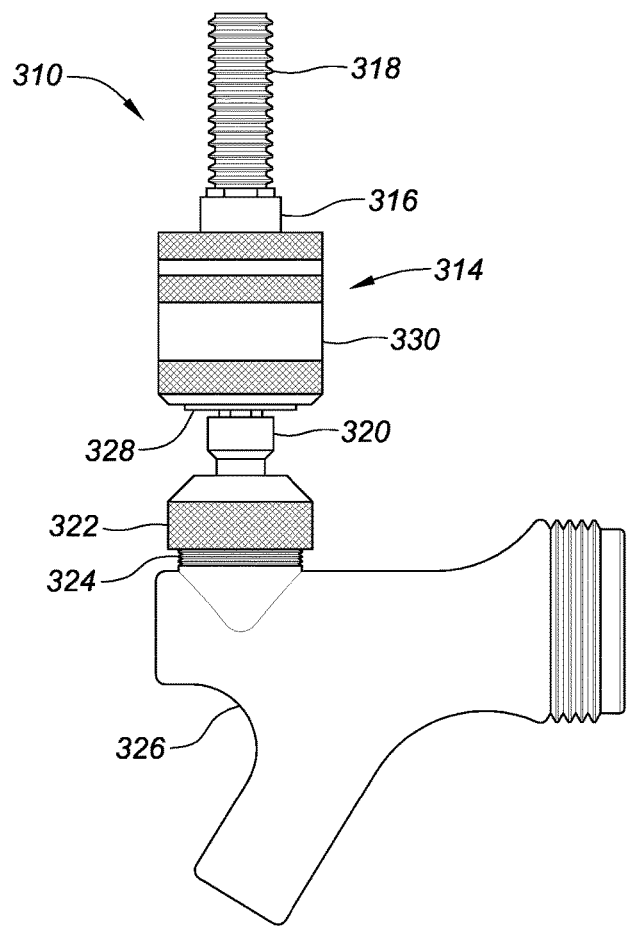
FIG. 12A
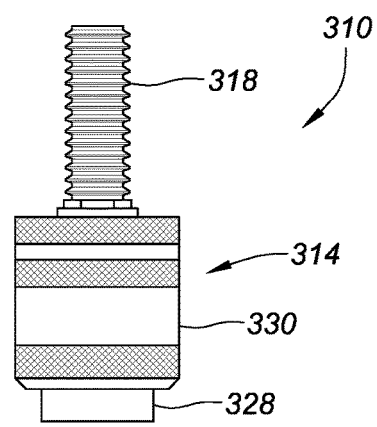
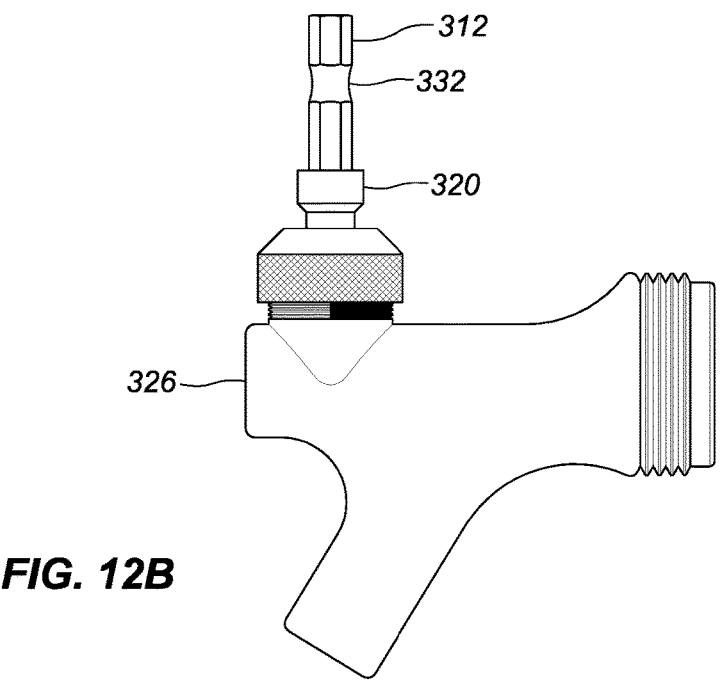
FIG. 12B

QUICK RELEASE BEVERAGE DISPENSER WITH KEYED COUPLER

CROSS-REFERENCE TO RELATED APPLICATIONS

This application claims the benefit of U.S. provisional application No. 63/012,115 (the '115 application), filed 18 Apr. 2020. This application claims the benefit of U.S. provisional application No. 63/068,726 (the '726 application), filed 21 Aug. 2020. The '115 application and the '726 application are both hereby incorporated by reference in their entirety as though fully set forth herein.

BACKGROUND a. Field of the Invention

The present disclosure relates generally to a quick release beverage dispenser with keyed coupler.

b. Background Art

Beverage dispensing systems can be used in bars, restaurants, concessions, among other types of businesses, to dispense liquids (e.g., beverages) for consumption by individuals. In some of these beverage dispensing systems, a liquid storage container (e.g., keg) can be fluidly coupled with a fluid dispensing device (e.g., tap) via a conduit through which the liquid travels from the keg to the tap. The tap can be activated to dispense liquid via a handle coupled to a tap lever, which can open or close a valve. The handle can be grasped by a user of the system and pulled/pushed to open or close the valve, allowing for liquid to be dispensed from the tap.

In some systems, the handle can include branding that indicates what type of beverage is being dispensed by the tap, which can be helpful for indicating to a user what beverage is associated with each tap, in a system that includes multiple taps. This can also be helpful for indicating to a customer what types of beverages are available.

In some systems, the handle can be removed from the tap to allow for cleaning. Further, the handle can be removed from the tap to allow for a different beverage to be served from the particular tap, when the handle includes branding that indicates a particular type of beverage. Generally, the handle can be removed by unscrewing a threaded coupler from a threaded shaft that is attached to the tap lever. Use of a threaded coupler can be associated with numerous problems. For example, an increased amount of time can be associated with unthreading the threaded coupler. This can result in an increased amount of time to change out the tap from one beverage to another. Furthermore, beverage dispensing systems need to be regularly cleaned, which requires removal of the tap handles. This can be time consuming in systems that includes multiple tap handles, which in some instances can include over 50 tap handles.

Furthermore, problems can be associated with aligning the tap handle so a customer and/or user of the tap handle can read labeling included on the handle. Many tap handles can include branding that identifies a company that makes the beverage and/or a type of beverage being dispensed by the tap handle. The branding can oftentimes include ornate designs and logos associated with the company. When a tap handle is screwed onto the tap lever, there can oftentimes be no way to ensure that when the tap handle is fully threaded onto the tap lever, that the handle is facing the proper direction.

SUMMARY

Various embodiments of the present disclosure include a beverage dispenser. The beverage dispenser can include a tap handle. In some embodiments, the beverage dispenser can include a faucet that includes a faucet lever. In some embodiments, the beverage dispenser can include the tap handle is configured to be coupled to the faucet lever via a quick release keyed coupler. In some embodiments, the quick release keyed coupler is configured to prevent rotation of the tap handle with respect to the faucet.

Various embodiments of the present disclosure include a beverage dispenser. The beverage dispenser can include a tap handle. In some embodiments, the beverage dispenser can include a faucet that includes a faucet lever. In some embodiments, the beverage dispenser can include a quick release coupler disposed between the tap handle and the faucet lever. In some embodiments, the quick release coupler includes a male portion and a female portion, each extending along a same longitudinal axis. In some embodiments, the female portion is connected to a distal end of the tap handle. In some embodiments, the male portion is connected to a proximal end of the faucet lever, wherein the male portion and the female portion each include correspondingly keyed features.

BRIEF DESCRIPTION OF THE DRAWINGS

FIG. 8A depicts a side view of another embodiment of a quick release beverage dispenser, in accordance with embodiments of the present disclosure.

FIG. 8B depicts a cross-sectional view of the quick release beverage dispenser depicted in FIG. 8A, in a direction of line A-A.

FIG. 12A is a side view of a quick release beverage dispenser that includes a keyed male portion and keyed female portion in a locked position, in accordance with embodiments of the present disclosure.

FIG. 12B is a side view of a quick release beverage dispenser that includes a keyed male portion and keyed female portion in an unlocked position, in accordance with embodiments of the present disclosure.

DETAILED DESCRIPTION

Figure 1A:
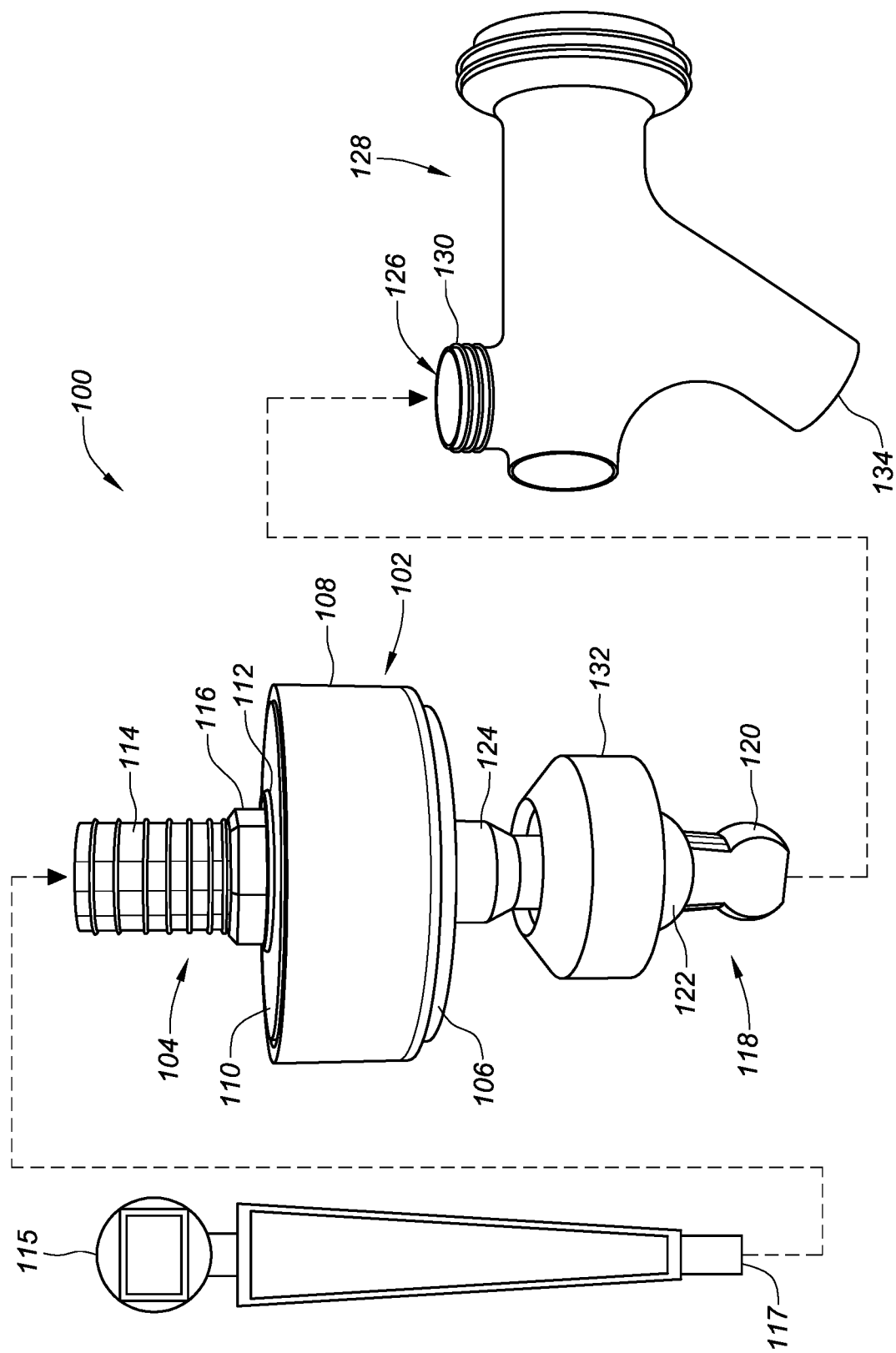
FIG. 1A is a side view of a quick release beverage dispenser with keyed coupler in an inactive state, in accordance with embodiments of the present disclosure.

Referring now to the drawings wherein like reference numerals are used to identify identical components in the various views, FIG. 1A is a side view of a quick release beverage dispenser 100 with keyed coupler in an inactive state, in accordance with embodiments of the present disclosure. In some embodiments, the quick release beverage dispenser 100 can include a quick release keyed beverage dispenser coupler. For example, the quick release beverage dispenser 100 can include a quick release female portion 102 and a keyed male portion 104. The quick release female portion 102 can include a base portion 106, an outer collar 108, a retaining washer 110, and a retaining ring 112, further discussed herein. The keyed male portion 104 can include handle attachment portion 114, which is depicted as being threaded. However, in some embodiments, the handle attachment portion 114 can be attached to a tap handle in ways that do not involve threaded engagement. For example, the handle attachment portion 114 may not be threaded and may be attached to the tap handle via an interference fit or other form of attachment. As further depicted, a tap handle 115 can be coupled with the handle attachment portion 114 via a handle coupler 117.

The keyed male portion 104 can further include a keyed shaft 116, which can be inserted into a correspondingly keyed lumen 142 (FIG. 3A), which is defined in the quick release female portion 102. The engagement between the keyed shaft 116 and the correspondingly keyed lumen 142 can prevent the keyed male portion 104 from rotating about its longitudinal axis with respect to the correspondingly keyed lumen 142 and the quick release female portion 102.

As further depicted in FIG. 1A, the quick release beverage dispenser is shown as being attached to a faucet lever 118. The faucet lever 118 can include a faucet actuator 120, a faucet ball 122, and a faucet shaft 124. The faucet lever 118 can be inserted into a valve lumen 126 of a faucet body 128. The faucet lever 118 can be connected to a threaded portion 130 of the faucet body 128 via a correspondingly threaded bonnet 132, through which the faucet lever 118 is disposed, as depicted in FIG. 1A. Although not depicted, the faucet body 128 can be coupled to a tower, which includes one or more faucet bodies fluidly coupled to one or more liquid storage containers (e.g., kegs). Although the keyed male portion 104 is depicted as being attached to the tap handle 115 and quick release female portion 102 is depicted as being attached to the faucet body 128; the keyed male portion 104 can be attached to the faucet body 128 and the quick release female portion 102 can be attached to the tap handle 115.

Figure 1B:
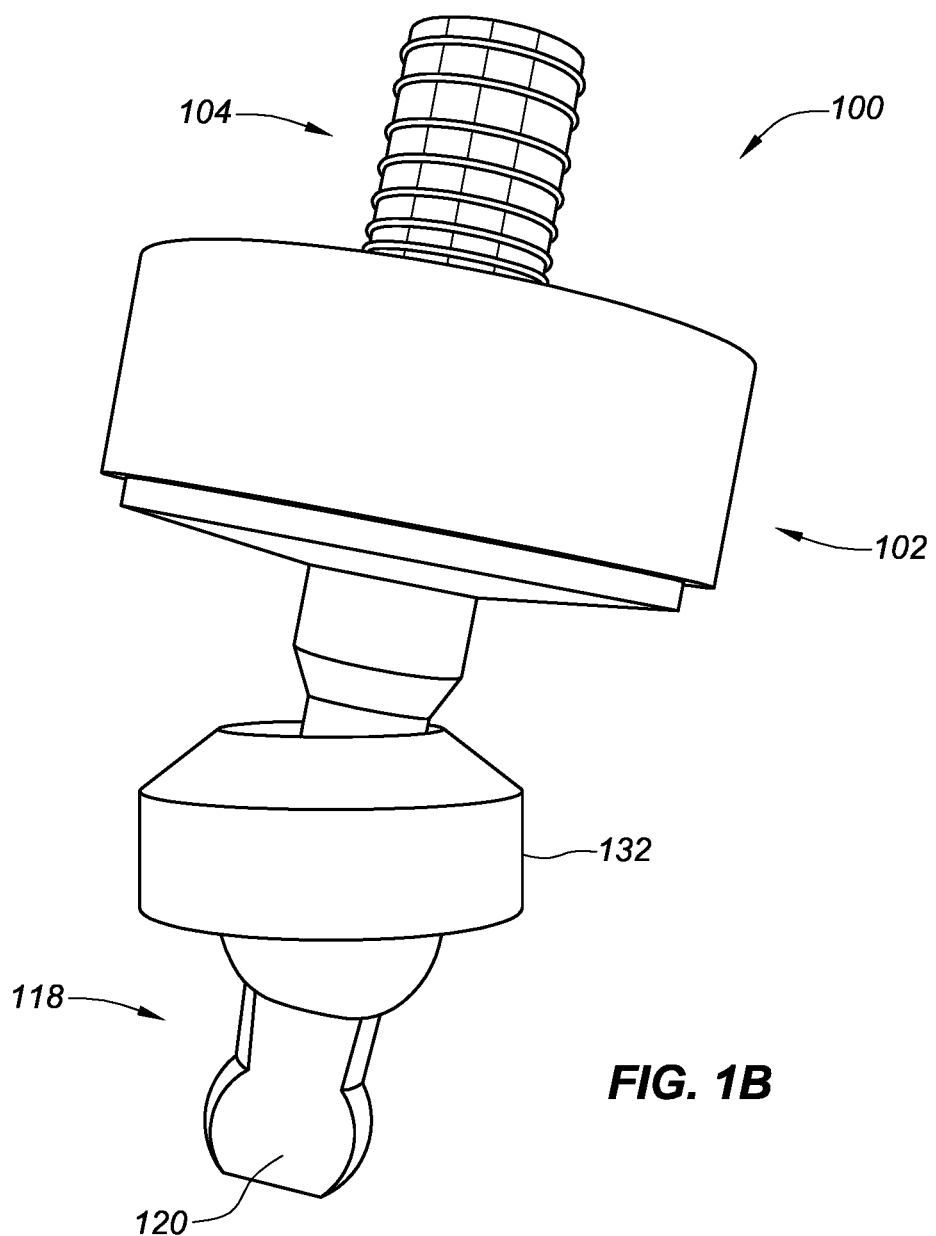
FIG. 1B is a side view of a quick release beverage dispenser with keyed coupler in an active state, in accordance with embodiments of the present disclosure.

FIG. 1B is a side view of a quick release beverage dispenser 100 with keyed coupler in an active state, in accordance with embodiments of the present disclosure. The quick release beverage dispenser 100 can include a quick release keyed coupler to allow for a tap handle 115 to be quickly separated from a faucet 128. As depicted in FIG. 1B, the quick release beverage dispenser 100 can be pulled/pushed by a user via an attached tap handle 115 (depicted in FIG. 1A), causing the keyed male portion 104, the quick release female portion 102, and the faucet lever 118 to tilt with respect to the bonnet 132 and an associated faucet body 128 (depicted in FIG. 1A). This can cause the faucet actuator 120 to move a valve body, not depicted, allowing for the flow of liquid out of a spout 134 of the faucet body 118.

Figures 1C, 1D:
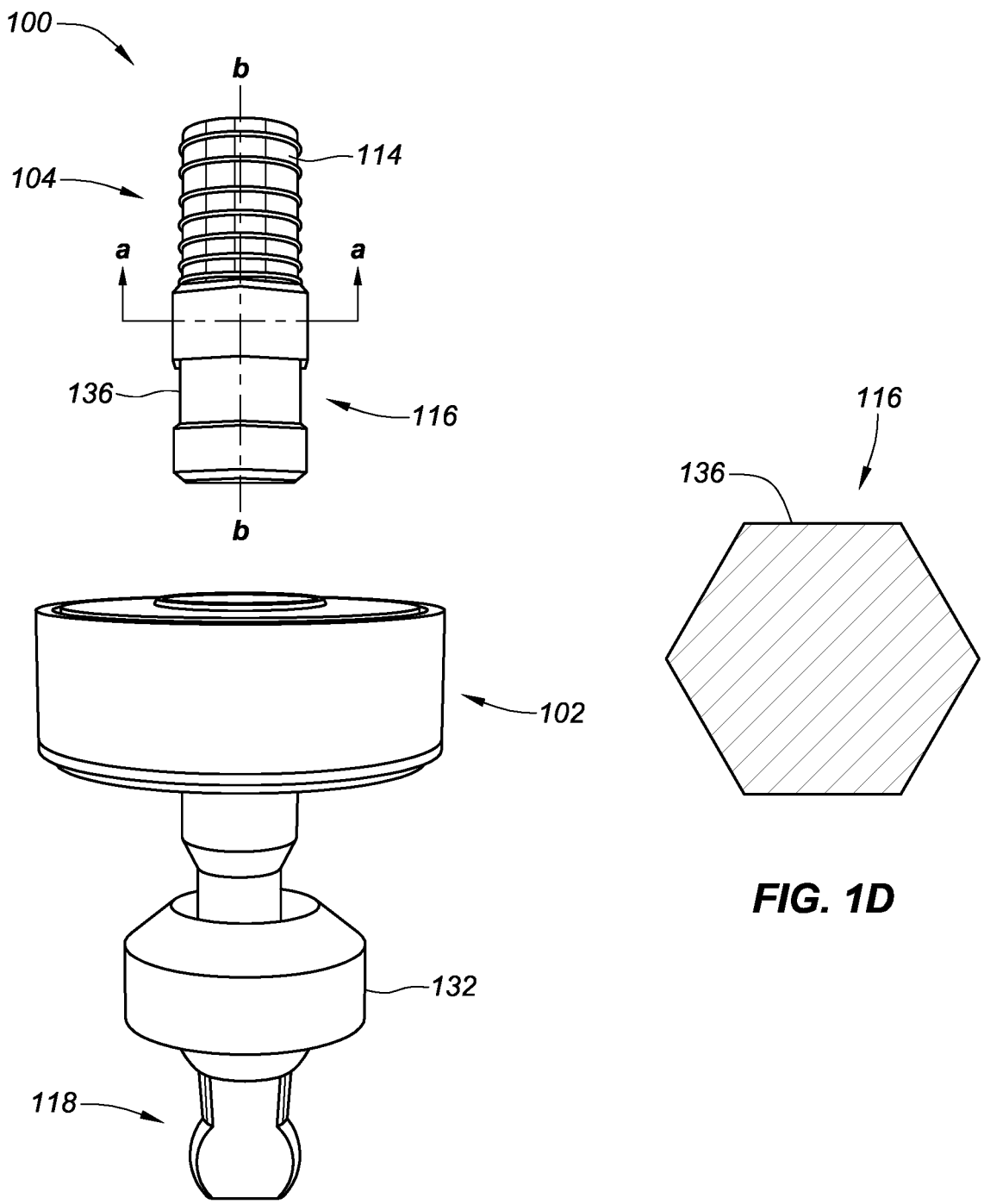
FIG. 1C is a side view of a female portion of the quick release beverage dispenser, separated from a keyed male portion of the quick release beverage dispenser, in accordance with embodiments of the present disclosure.
FIG. 1D is a cross-sectional view of the keyed male portion of the quick release beverage dispenser in the direction of line a-a, in accordance with embodiments of the present disclosure.

FIG. 1C is a side view of a female portion 102 of the quick release beverage dispenser 100 separated from a keyed male portion 104 of the quick release beverage dispenser 100, in accordance with embodiments of the present disclosure. In some embodiments, as previously discussed, the keyed male portion 104 can include a handle attachment portion 114 and a keyed shaft 116. The keyed shaft 116 can be hexagonal in shape, along its cross section, depicted by line a-a, further depicted in FIG. 1D. Although the cross section is depicted as being hexagonal in shape, the cross section can be any keyed shape.

A keyed shape can be defined as any shape that when inserted into a correspondingly keyed lumen, does not allow for the keyed shape to be rotated with respect to the keyed lumen. For instance, the keyed shaft 116 cannot be rotated about its longitudinal axis b-b with respect to a correspondingly keyed lumen 142 defined in the quick release female portion 102, when the keyed shaft 116 is inserted into the keyed lumen. In some embodiments, the cross-sectional shape of the keyed shaft 116 can be any polygonal shape, including a triangle, a square, a pentagon, hexagon, heptagon, octagon, nonagon, decagon, etc. In some embodiments, the cross-sectional shape of the keyed shaft 116 can be an oval.

For example, in some embodiments, the keyed male portion 104 can have an outer circumferential profile that corresponds to a circumferential inner profile of the quick release female portion 102. In some embodiments, contact between the outer circumferential profile of the male portion and the circumferential inner profile of the female portion (e.g., occurring when the male portion is inserted into the female portion) can prevent rotation of the tap handle with respect to the faucet. In some embodiments, the male portion can include a number of male faces defined about a circumference of the male portion. The female portion can include a number of corresponding female faces. Contact between the male faces and the corresponding female faces can prevent rotation between the male portion and the female portion. As discussed herein, the number of corresponding male and female faces can range from 3 to 10.

Embodiments of the present disclosure can allow for a tap handle connected to the keyed shaft 116 to be inserted into a correspondingly keyed lumen defined in the quick release female portion, such that a direction in which the tap handle is facing can be chosen by the user. For instance, where the keyed shaft 116 is hexagonally shaped, the keyed shaft 116 can be placed into the keyed lumen such that the tap handle can be disposed at six different angles about its longitudinal axis. In some embodiments, based on the particular cross-sectional shape of the keyed shaft 116, an attached tap handle can be disposed at greater than or less than six different angles. For example, where the cross-sectional shape of the keyed shaft 116 is decagonal in shape, the tap handle can be disposed at ten different angles. This can provide an advantage where it is beneficial to maintain a particular orientation of a tap handle. For example, where a tap handle has logos of a type of beverage and/or manufacturer of the beverage on opposing sides, it can be beneficial to direct a first side so that it can be viewed by a customer and a second side so that it can be viewed by a user (e.g., bar tender) of the quick release beverage dispenser. This can allow the customer to see what brands of beverages are being served and can allow for the user of the dispenser to know what beverage they are dispensing. Furthermore, the cross-sectional shape of the keyed shaft 116 can prevent a tap handle connected to the keyed male portion 104 from accidentally rotating and becoming misaligned.

As further depicted in FIG. 1C, the keyed shaft 116 can define a groove 136 about its circumference. As further discussed herein, a retaining element (e.g., quick release ball) can be inserted into the groove 136, preventing accidental disengagement between the keyed male portion 104 and the quick release female portion 102. The keyed shaft 116 is further depicted with respect to FIG. 2, which is a side view of the keyed male portion 104 of the quick release beverage dispenser depicted in FIGS. 1A to 1E, in accordance with embodiments of the present disclosure.

Figure 1E:
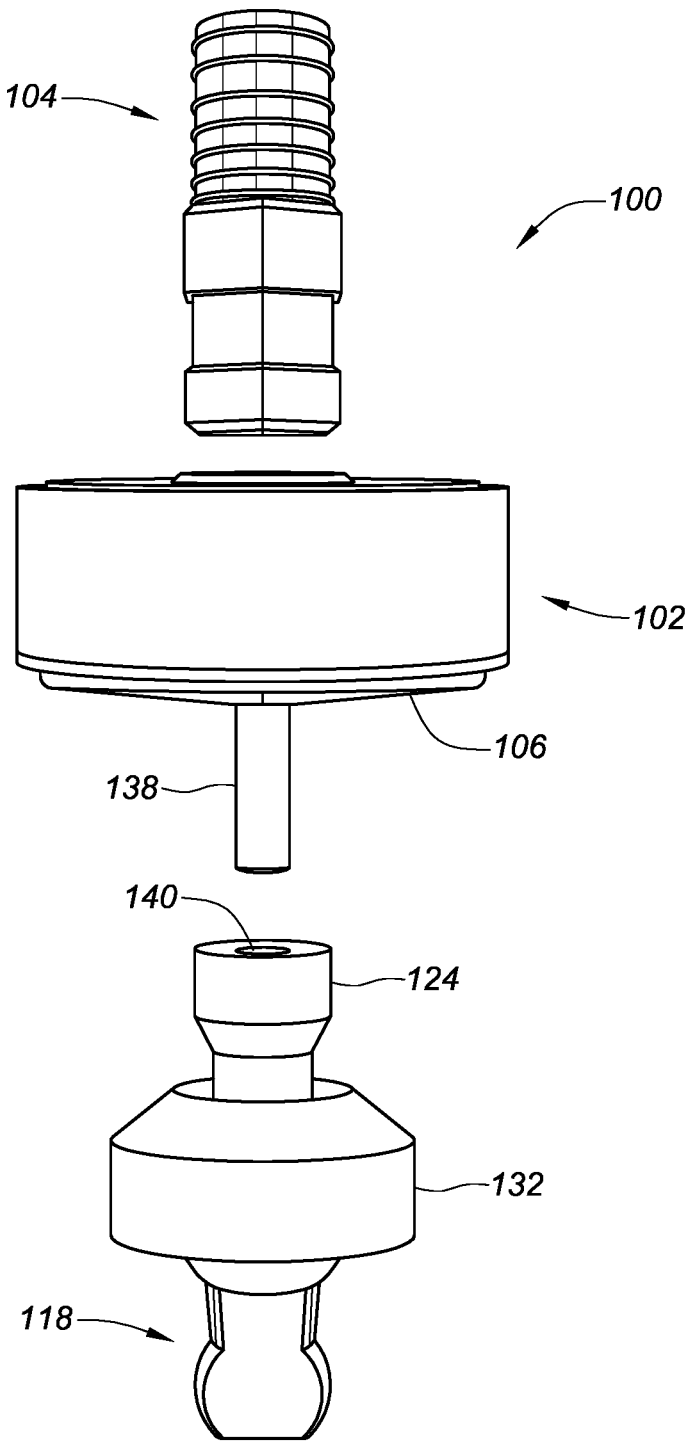
FIG. 1E is a side view of the separation between the male and female portions of the quick release beverage dispenser, as depicted in FIGS. 1A to 1C, as well as a bonnet and valve stem, in accordance with embodiments of the present disclosure.
Figure 2:
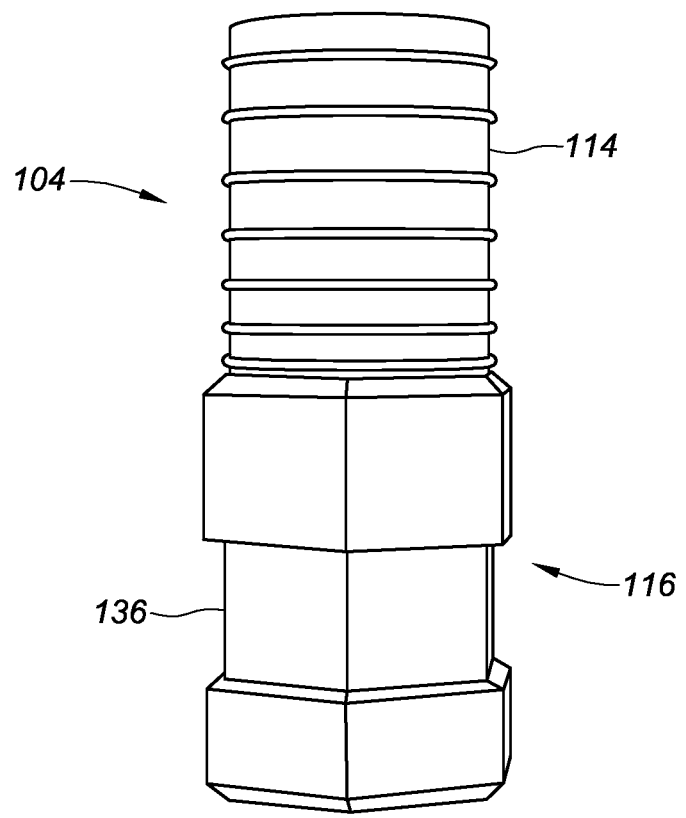
FIG. 2 is a side view of the keyed male portion of the quick release beverage dispenser depicted in FIGS. 1A to 1E, in accordance with embodiments of the present disclosure.

FIG. 1E is a side view of the separation between the female and male portions 102, 104 of the quick release beverage dispenser 100, as depicted in FIGS. 1A, 1B, and 1C, as well as a bonnet 132 and valve stem 124 of the faucet lever 118, in accordance with embodiments of the present disclosure. In some embodiments, a shaft 138 can extend longitudinally from a distal end of the base portion 106, as depicted in FIG. 1E. The shaft 138 can be accepted in a lumen 140 defined in a proximal face of the valve stem 124. In some embodiments, the shaft 138 can be retained in the lumen 140 via an interference fit, threaded engagement, an adhesive, welding, etc.

Figure 3A:
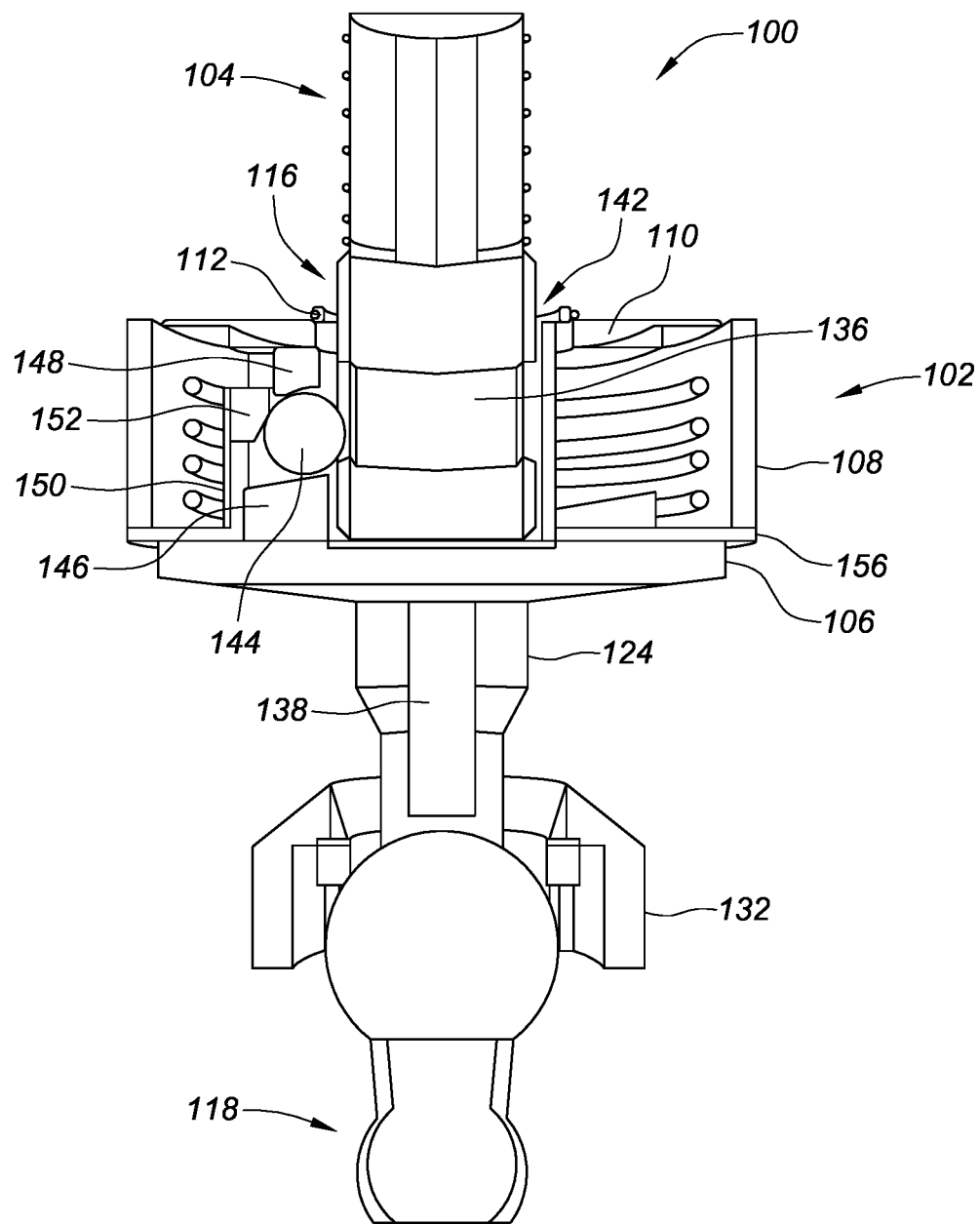
FIG. 3A is a cross-sectional side view of the quick release beverage dispenser with keyed coupler depicted in FIGS. 1A, 1B, 1C, and 1E, in accordance with embodiments of the present disclosure.
Figure 3B:
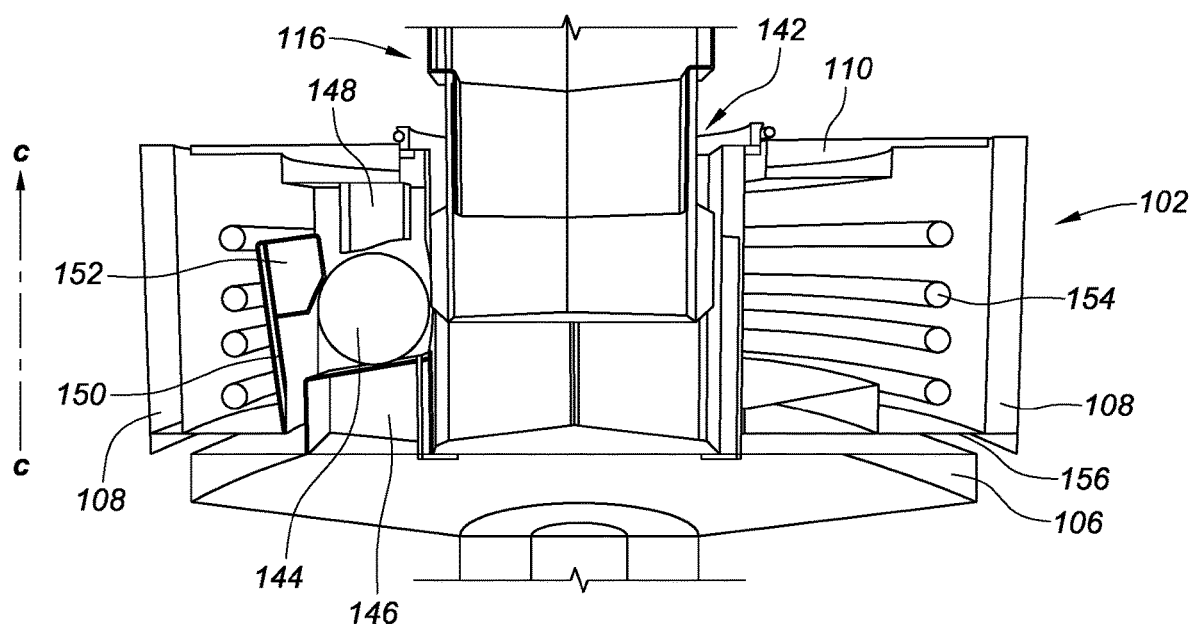
FIG. 3B is a cross-sectional close up view of the quick release beverage dispenser depicted in FIG. 3A, in accordance with embodiments of the present disclosure.

FIG. 3A is a cross-sectional side view of the quick release beverage dispenser 100 with keyed coupler depicted in FIGS. 1A, 1B, 1C, and 1E, in accordance with embodiments of the present disclosure. FIG. 3B is a cross-sectional close up view of the quick release beverage dispenser 100 depicted in FIG. 3A, in accordance with embodiments of the present disclosure. As depicted, the keyed male portion 104 has been inserted into a correspondingly keyed lumen 142. As further depicted in FIG. 3A, the quick release female portion can house a retaining feature (e.g., retaining ball 144), which can be laterally pushed into the groove 136 by a base ramp 146 on a distal side of the retaining ball 144 and a top ramp 148 on a proximal side of the ball. In an example, a coaxial spring 154 can generate a force between the retaining washer 110 and a collar base 156 of the collar 108. The force can thus be transferred between the base ramp 146 and the top ramp 148 to the retaining ball 144, urging the retaining ball 144 into contact with the groove 136, as a result of the angled opposing surfaces of the base ramp 146 and the top ramp 148. As depicted, the base ramp 146 can extend proximally from the base portion 106 and the top ramp 148 can extend distally from the retaining washer 110.

In some embodiments, a retaining spring 150 and a retaining spring head 152 can extend proximally from the collar base 156. The spring head 152 can be configured to contact the retaining ball 144 and urge the retaining ball 144 into a pocket created by the opposing faces of the base ramp 146 and top ramp 148. For example, when the quick release female portion 102 is lifted in a direction of arrow c-c (FIG. 3B), a distance between the opposing faces of the base ramp 146 and top ramp 148 increases to greater than a diameter of the retaining ball 144, allowing the ball 144 to move radially outward toward the spring head 152. As a user pulls the keyed male portion 104 from the quick release female portion 102, also in the direction of arrow c-c, the spring 150 can be deflected by a lateral force exerted from the distal portion of the keyed shaft 116 on the retaining ball 144 and thus on the spring head 152 and spring 150. When the keyed shaft 116 has been removed from the correspondingly keyed lumen 142, the spring 150 and spring head 152 can urge the retaining ball 144 back into the pocket defined by the opposing faces of the base ramp 146 and top ramp 148, effectively causing the ball to be captured between the spring head 152 and the opposing faces of the base ramp 146 and top ramp 148.

Figure 4A:
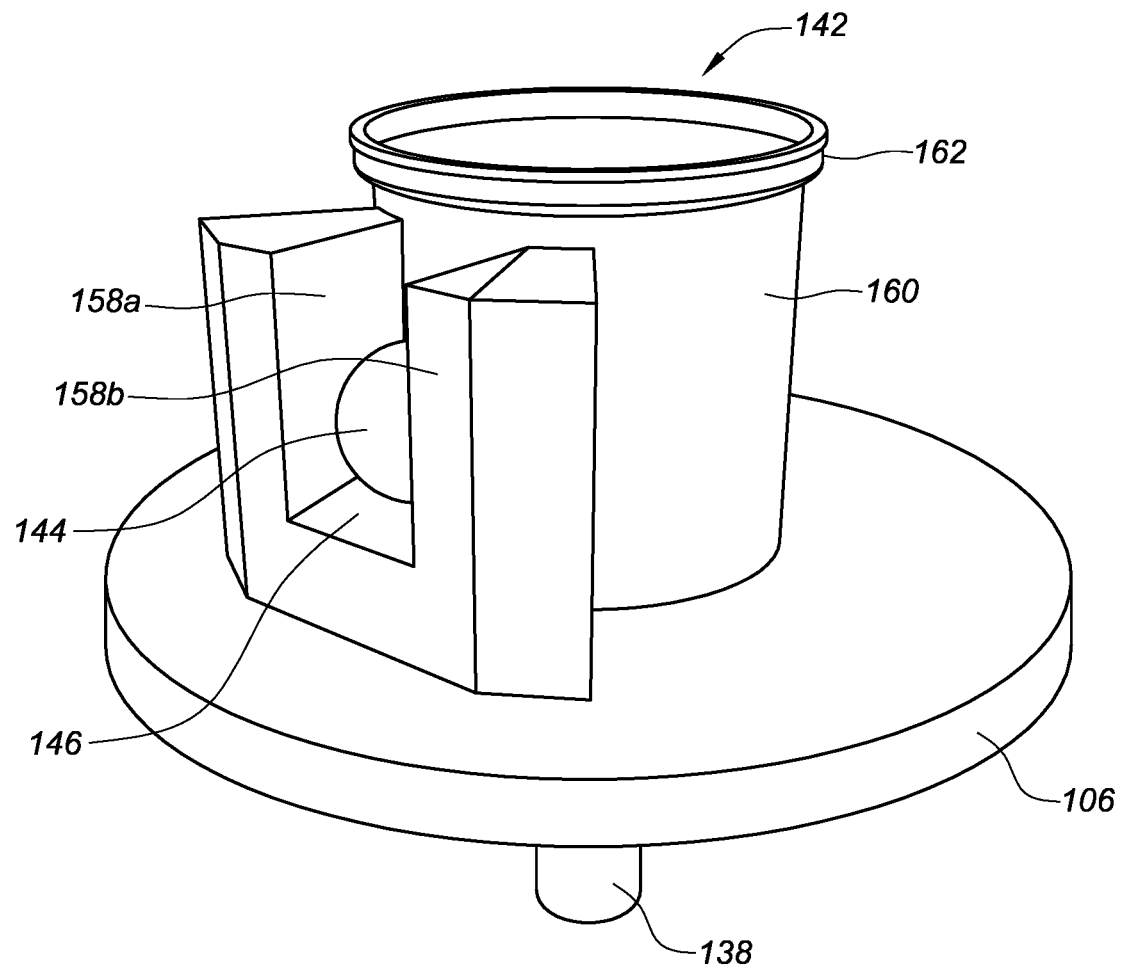
FIG. 4A is an isometric view of a base of the female portion of the quick release beverage dispenser, including a quick release ball, in accordance with embodiments of the present disclosure.

FIG. 4A is an isometric view of a base 106 of the female portion of the quick release beverage dispenser, including a retaining ball 144, in accordance with embodiments of the present disclosure. As depicted, the base 106 can include a longitudinally extending tubular structure 160 that extends proximally with respect to the base 106. The tubular structure 160 can define the correspondingly keyed lumen 142, which is correspondingly keyed with the keyed shaft 116 to prevent rotation of the keyed shaft 116 with respect to the base 106. The proximal outer portion of the tubular structure 160 defines a circumferentially extending slot 162, in which the retaining ring 112 can be disposed (e.g., to capture the retaining washer 110).

As further depicted, a ball retaining structure is disposed on the proximal side of the base 106 and includes the base ramp 146, as well as support walls 158a, 158b, which longitudinally and proximally extend from either side of the base ramp 146 to retain the quick release ball 146. As further depicted in FIG. 4A, the shaft 138 can be seen extending distally from the distal face of the base 106, to which it is fastened.

Figure 4B:
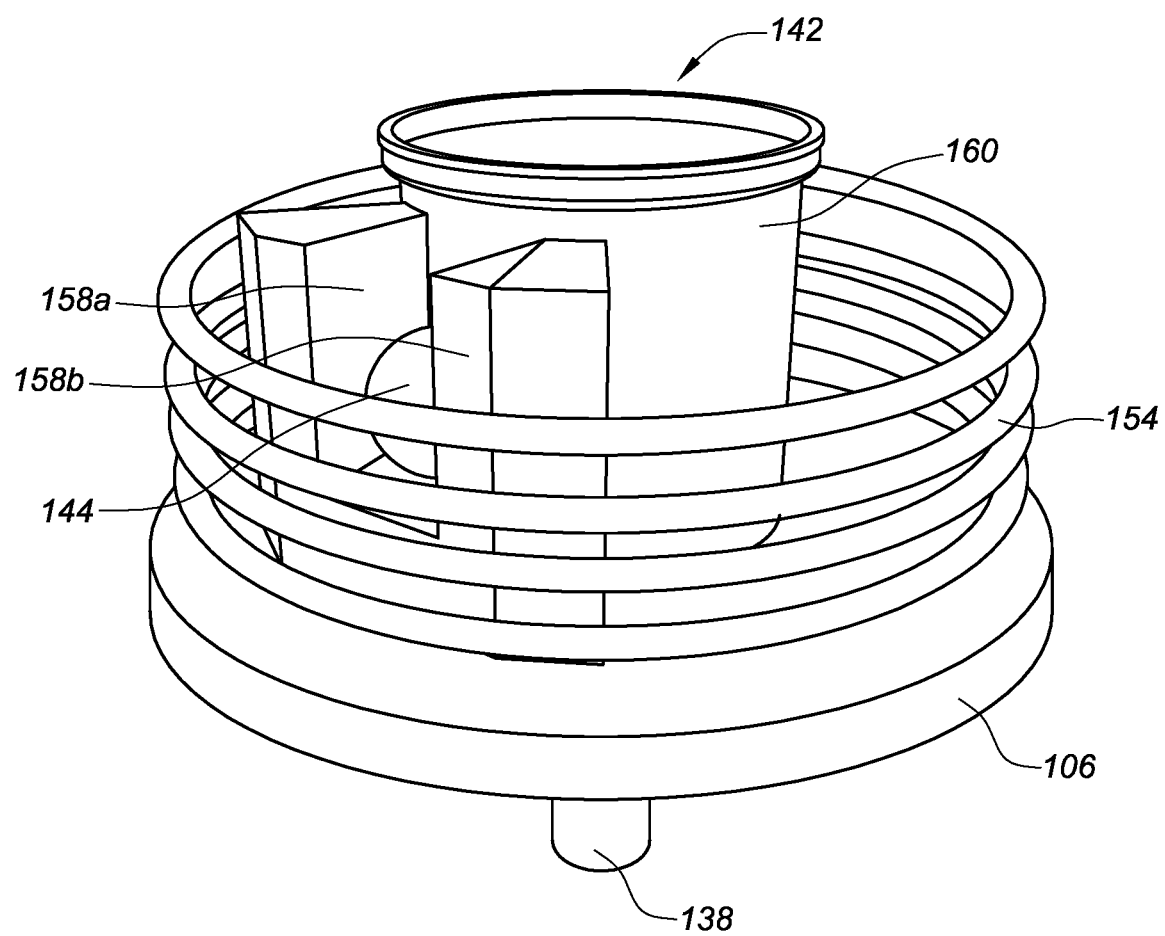
FIG. 4B is an isometric view of the base and quick release ball depicted in FIG. 4A, with the addition of a coaxial tensioning spring, in accordance with embodiments of the present disclosure.

FIG. 4B is an isometric view of the base 106 and retaining ball 144 depicted in FIG. 4A, with the addition of a coaxial tensioning spring 154, in accordance with embodiments of the present disclosure. In some embodiments, as discussed herein, the coaxial tensioning spring 154 can generate a force between the retaining washer 110 and a collar base 156 of the collar 108. The force can thus be transferred between the base ramp 146 and the top ramp 148 to the retaining ball 144, urging the retaining ball 144 into contact with the groove, as a result of the angled opposing surfaces of the base ramp 146 and the top ramp 148.

Figure 5A:
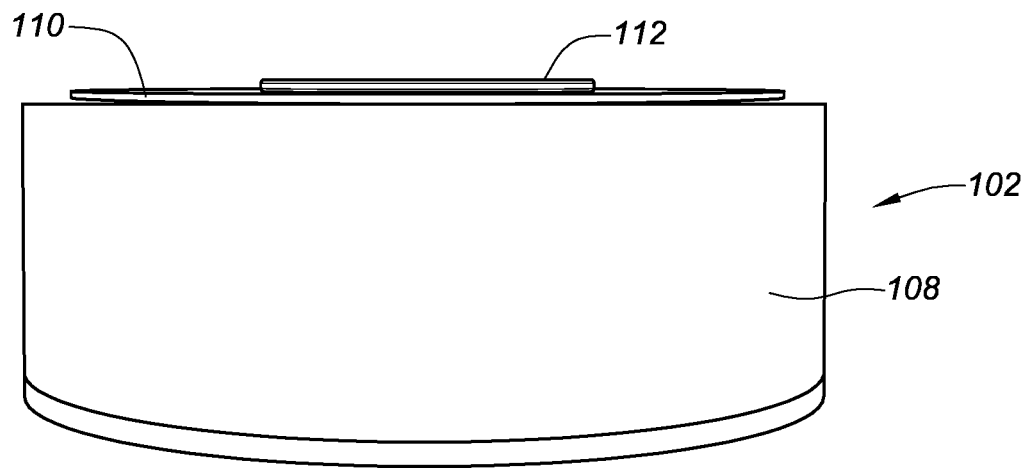
FIG. 5A is a side view of the female portion of the quick release beverage dispenser, as depicted in FIGS. 1A to 1C and 1E, including a collar, retaining washer, and retaining ring, in accordance with embodiments of the present disclosure.

FIG. 5A is a side view of the female portion 102 of the quick release beverage dispenser, as depicted in FIGS. 1A to 1C and 1E, including collar 108, retaining washer 110, and retaining ring 112, in accordance with embodiments of the present disclosure. Details of the retaining washer 110 are further depicted in FIG. 5B.

Figure 5B:
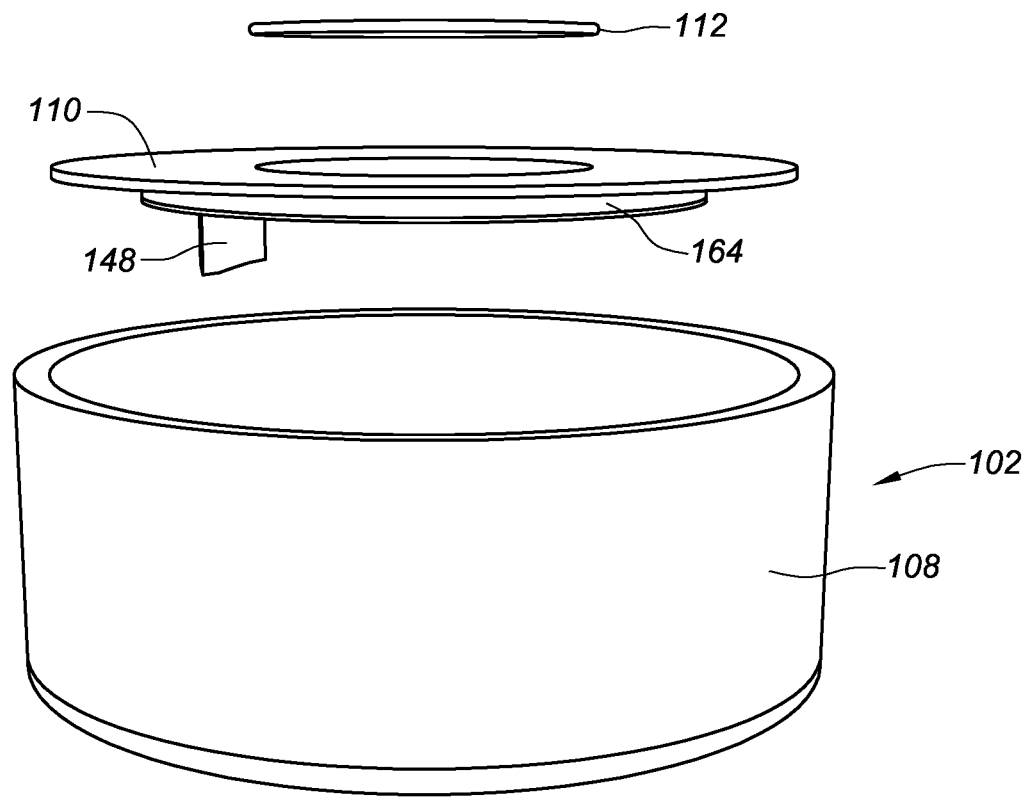
FIG. 5B is an isometric view of the outer collar of the female portion of the quick release beverage dispenser, retaining washer, and retaining spring, as depicted in FIG. 5A, in a disassembled state, in accordance with embodiments of the present disclosure.

FIG. 5B is an isometric view of the outer collar 108 of the female portion 102 of the quick release beverage dispenser, retaining washer 110, and retaining ring 112, as depicted in FIG. 5A, in a disassembled state, in accordance with embodiments of the present disclosure. As further depicted, the top ramp 148 extends distally from a bottom face of the retaining washer 110. In some embodiments, the retaining washer 110 can include a distally extending raised portion 164, which can help to capture and align the coaxial spring 154.

Figure 5C:
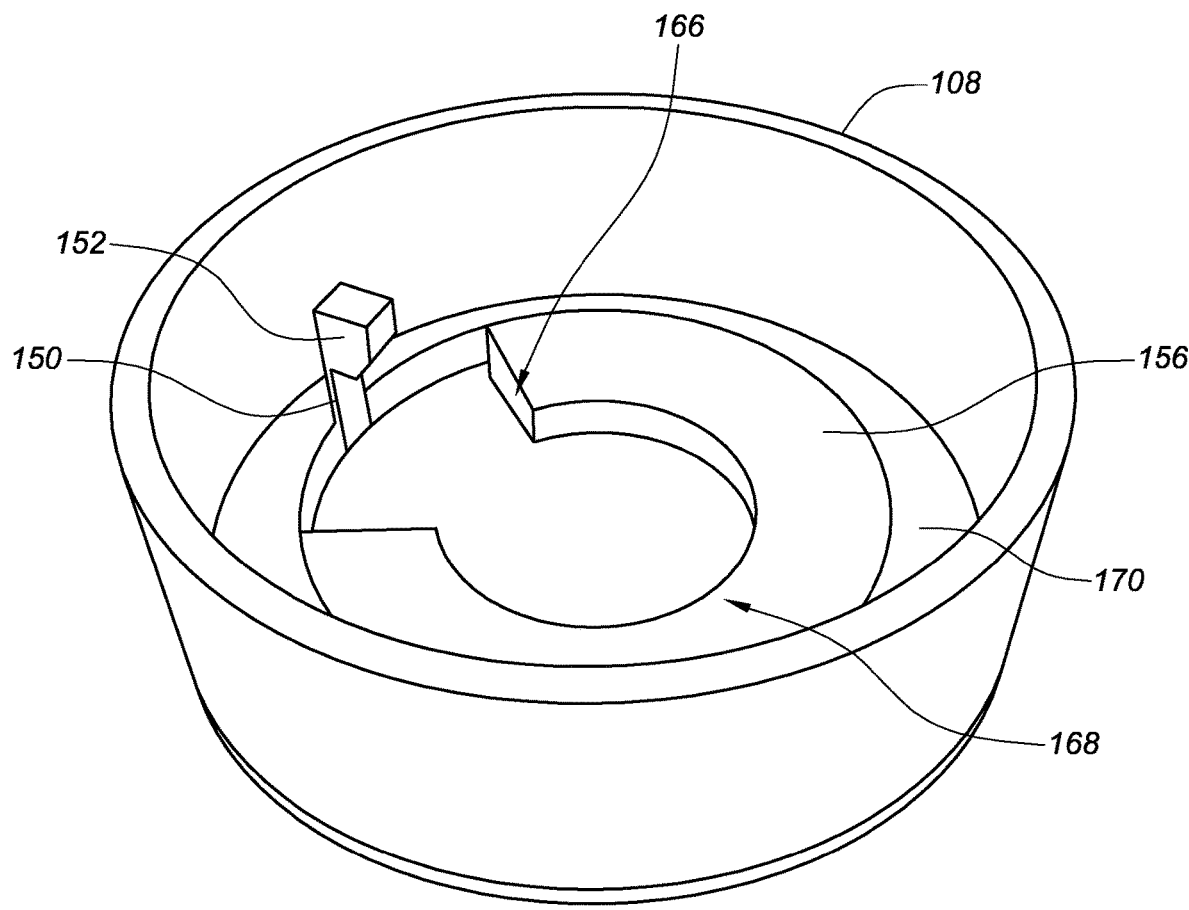
FIG. 5C is an isometric view of the outer collar of the female portion of the quick release beverage dispenser depicted in FIGS. 5A and 5B, in accordance with embodiments of the present disclosure.
Figure 5D:
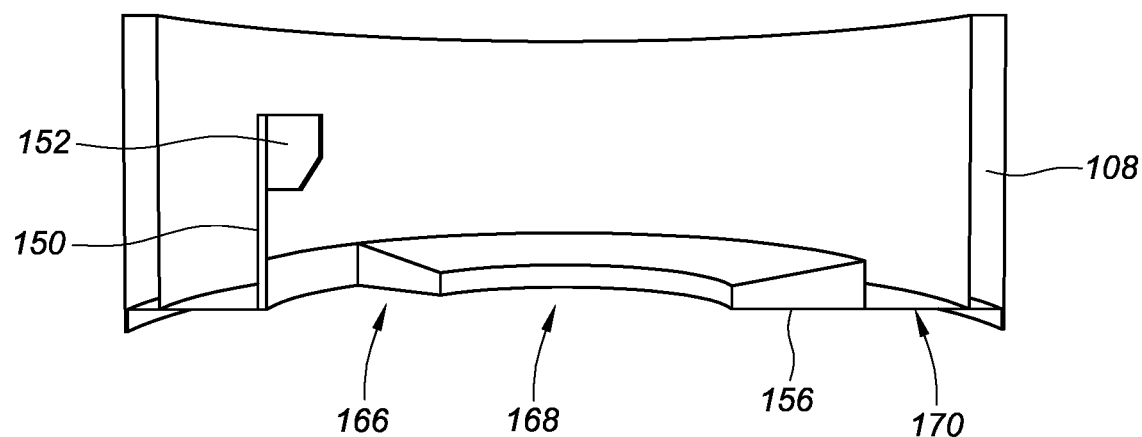
FIG. 5D is a cross-sectional side view of the outer collar of the female portion of the quick release beverage dispenser depicted in FIGS. 5A to 5C, in accordance with embodiments of the present disclosure.

FIG. 5C is an isometric view of the outer collar of the female portion of the quick release beverage dispenser depicted in FIGS. 5A and 5B, in accordance with embodiments of the present disclosure. FIG. 5D is a cross-sectional side view of the outer collar 108 of the female portion 102 of the quick release beverage dispenser depicted in FIGS. 5A to 5C, in accordance with embodiments of the present disclosure. As depicted, the outer collar 108 can include a collar base 156. In some embodiments, a lumen 168 can be defined in the collar base 156, through which the tubular structure 160 can be disposed, as depicted in FIG. 3B. In some embodiments, the collar base 156 can further include a support cutout 166, through which a retaining ball support structure, including the base ramp 146 and support walls 158a, 158b, depicted in FIG. 4A, can be disposed. As further depicted, the spring 150 and spring head 152 extend proximally from the collar base 156. In some embodiments, the collar base 156 can define a circumferential channel 170, in which the coaxial tensioning spring can be disposed.

Figure 6A:
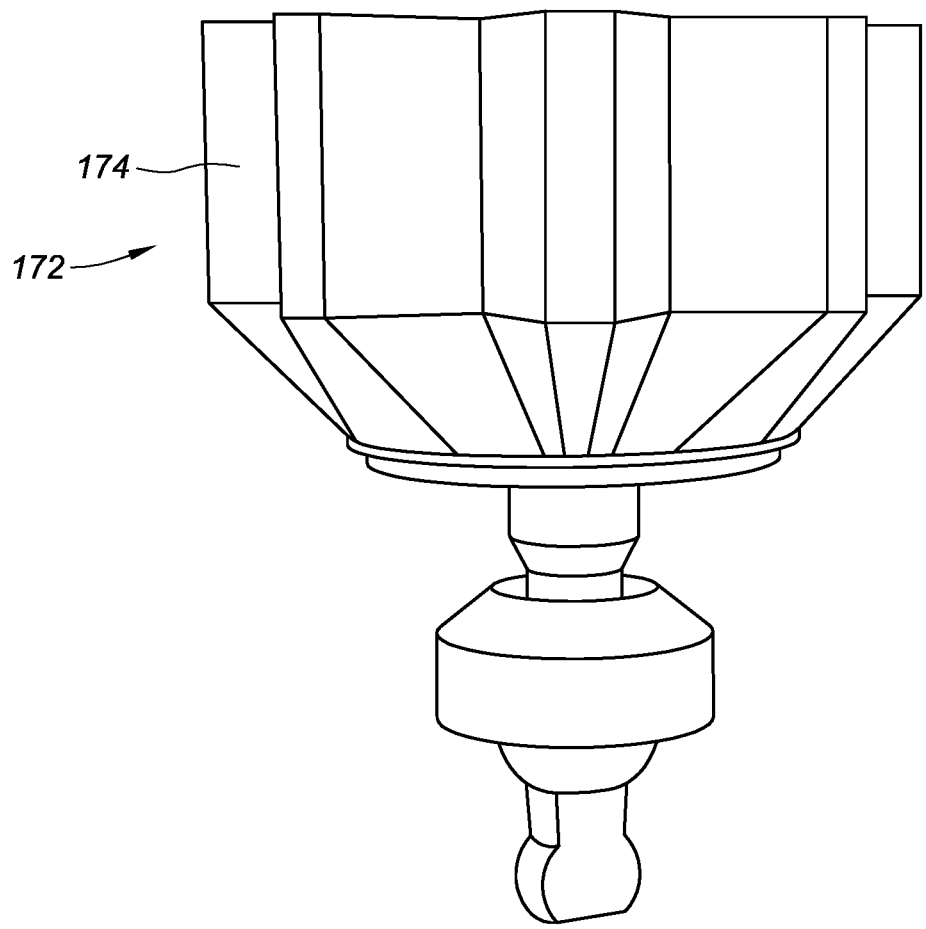
FIG. 6A is a side view of a quick release beverage dispenser with a variation in a design of the outer collar, in accordance with embodiments of the present disclosure.
Figure 6B:
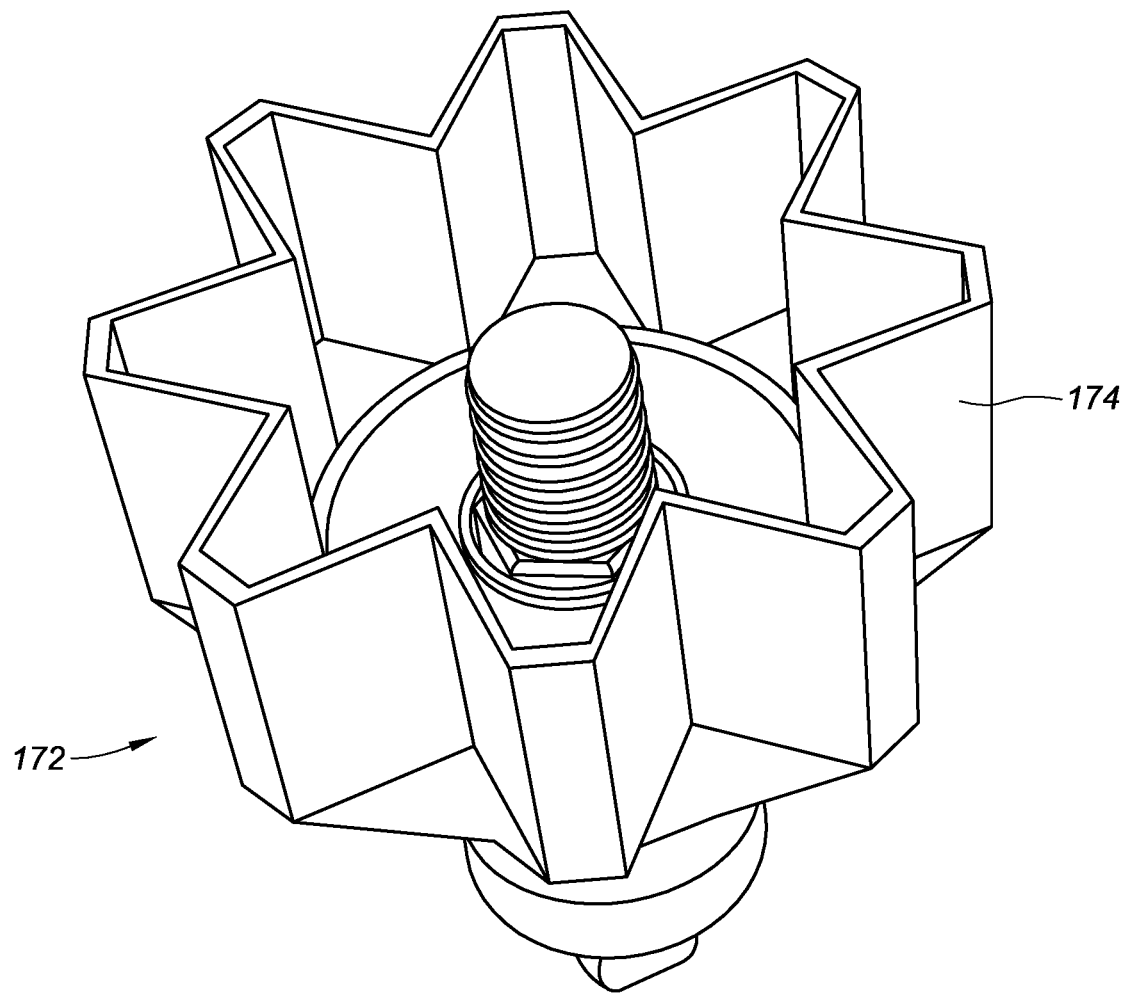
FIG. 6B is an isometric view of a quick release beverage dispenser with a variation in a design of the outer collar, in accordance with embodiments of the present disclosure.

FIG. 6A is a side view of a quick release beverage dispenser 172 with a variation in a design of the outer collar 174, in accordance with embodiments of the present disclosure. FIG. 6B is an isometric view of a quick release beverage dispenser 172 with a variation in a design of the outer collar 174, in accordance with embodiments of the present disclosure. As depicted, FIGS. 6A and 6B depict a quick release beverage dispenser 172 with keyed coupler. The embodiments depicted in FIGS. 6A and 6B can include the same or similar features as those discussed in relation to FIGS. 1A to 5D. As depicted, the quick release beverage dispenser 172 can include an outer collar 172 that is axially elongated and/or is of a particular design. In some embodiments, the outer collar 172 can extend proximally past a proximal end of the keyed male portion of the quick release beverage dispenser 172 and can provide room for branding to be placed on the outer collar 172.

Figure 7:
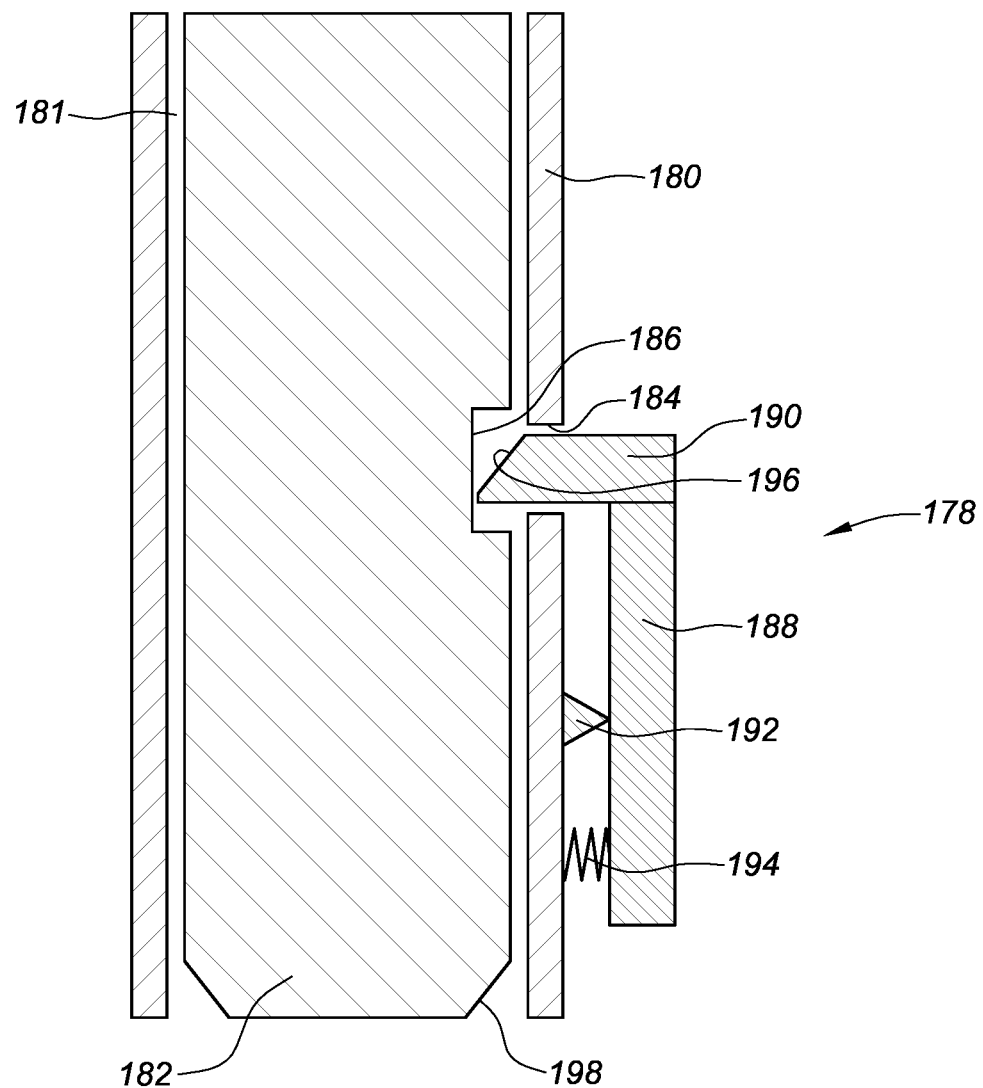
FIG. 7 depicts another embodiment of a quick release beverage dispenser, in accordance with embodiments of the present disclosure.

FIG. 7 depicts another embodiment of a quick release beverage dispenser 178, in accordance with embodiments of the present disclosure. As discussed in relation to FIG. 3A, for example, the quick release female portion 102 can house a retaining ball 144, which can be laterally pushed into the groove 136 by a base ramp 146 on a distal side of the retaining ball 144 and a top ramp 148 on a proximal side of the ball. In some embodiments, a retaining ball 144 and/or another retaining feature can be pushed into the groove by another mechanism than the base ramp 146 and the top ramp 148. As depicted in FIG. 7, in some embodiments, the quick release female portion 102, as depicted in FIG. 3A, can be replaced with another mechanism that allows for a retaining feature to be releasably engaged with the groove 136. In some embodiments, a female portion 180 can include a keyed lumen 181 into which a keyed male portion 182 can be disposed. In some embodiments, the female portion 180 can define a retaining feature hole 184, through which a retaining feature 190 can be disposed, such that it makes contact with a groove 186 defined in the keyed male portion 182. Various means of activation can be used to cause the retaining feature 190 to contact the groove 186. In some embodiments, a fulcrum lever 188 can be disposed on the female portion 180. As depicted, in some embodiments, the fulcrum lever 188 can be disposed on an exterior of the female portion 180. In some embodiments, one or more portions of the fulcrum lever 188 may be disposed within one or more portions of the female portion 180.

In some embodiments, the fulcrum lever 188 can be attached to the retaining feature 190, such that the retaining feature can releasably engage the groove 186. In operation, the fulcrum lever 188 can include a pivot point 192, about which the fulcrum lever 188 can pivot, causing the retaining feature to move into or out of the groove 186, allowing for removal or insertion of the keyed male portion 182. In some embodiments, the fulcrum can be assisted via a spring 194, to provide a force that causes constant engagement of the retaining feature with the groove 186. In operation, a user can depress the fulcrum lever 188 at a location above the spring 194, causing depression of the spring 194 and lifting of the retaining feature 190 from the groove 186. In some embodiments, the retaining feature 190 can include an angled face 196, such that upon insertion of the keyed male portion 182, the retaining feature 190 can be deflected, without a user having to depress the fulcrum lever 188. Alternatively, and/or in addition, one or more bottom edges 198 of the keyed male portion 182 can include angled faces 198, such that upon insertion of the keyed male portion 182, the retaining feature 190 can be deflected, without a user having to depress the fulcrum lever 188.

FIG. 8A depicts a side view of another embodiment of a quick release beverage dispenser 200, in accordance with embodiments of the present disclosure. FIG. 8B depicts a cross-sectional view of the quick release beverage dispenser 200 depicted in FIG. 8A, in a direction of line A-A. In some embodiments, the quick release beverage dispenser 200 can include a female quick release portion 202 that can define a lumen 203, therein. In some embodiments, the lumen 203 can be correspondingly keyed to a keyed male portion 204, as discussed herein. In some embodiments, the correspondingly keyed portions can be hex shaped, although the keyed portions can be of other shapes, as discussed herein. In some embodiments, the keyed male portion 204 can be attached to a faucet body 208, which can be included in a beverage tap assembly and can be used to selectively control the flow of a beverage, as discussed herein. The faucet body can be attached to the tap assembly via the bonnet 206, a friction washer, and plastic ball washer, as depicted in FIG. 8B. In some embodiments, the quick release female portion 202 can be attached to a tap handle via a threaded portion 212.

As depicted in FIG. 8B, in some embodiments, a magnet 210 can be included in the lumen 203. In FIG. 8B, the magnet 210 is depicted as being disposed in the top of the lumen 203. In some embodiments, one or more portions of the keyed male portion 204 can be formed from a magnetic material. In some embodiments, at least a top of the keyed male portion 204 that is disposed next to the magnet 210 can be formed from the magnetic material, such that upon insertion of the keyed male portion 204 into the lumen 203, the top of the keyed male portion 204 can be disposed within a magnetic field generated by the magnet 210. In some embodiments, the top of the keyed male portion 204 can come into contact with the magnet 210. In some embodiments, a gap can exist between the top of the keyed male portion 204 and the magnet. In either embodiment, the top of the keyed male portion 204 can become magnetically coupled with the magnet 210.

In operation, the female quick release portion 202 can be slid over the keyed male portion 204. In some embodiments, the quick release female portion 202 can be rotated such that a branding located on the branding wheel is facing a proper direction. The quick release female portion 202 and the branding wheel can then be inserted onto the keyed male portion 204. The magnetic coupling of the magnet 210 and the top of the keyed male portion 204 can provide for a coupling force that retains the keyed male portion 204 within the lumen 203 defined in the quick release female portion 202. When disengaging the tap handle and the female quick release portion 202 from the keyed male portion 204, a user can pull up on the tap handle, counteracting the coupling force generated by the magnet, allowing the tap handle and the female quick release portion 202 to be disengaged from the keyed male portion 204.

Figure 9A:
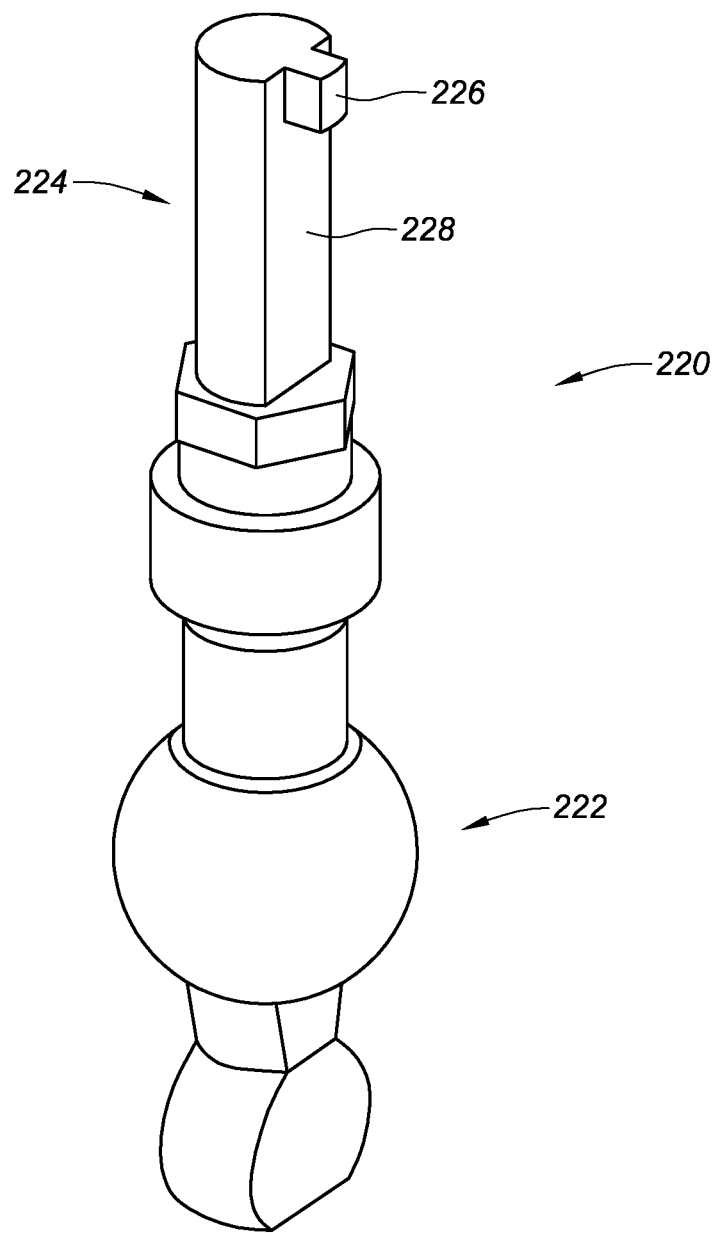
FIG. 9A depicts an isometric view of a keyed male portion of a quick release beverage dispenser, in accordance with embodiments of the present disclosure.

FIG. 9A depicts an isometric view of a keyed male portion 220 of a quick release beverage dispenser, in accordance with embodiments of the present disclosure. In some embodiments, the keyed male portion 220 of the quick release beverage dispenser can include a faucet body 222, which can be disposed in a beverage tap assembly and can be used to selectively control the flow of a beverage, as discussed herein. The faucet body 222 can be coupled with a tap assembly via a bonnet 262. In some embodiments, the keyed male portion 220 can include a keyed shaft 224. The keyed shaft 224 can include a key 226. As depicted in FIG. 9A, the key 226 can be disposed on a head portion of the keyed male portion 220 in some embodiments. In some embodiments, the key 226 can extend transverse to a longitudinal axis of the keyed shaft 224. As depicted, the keyed shaft 224 can include a flat side 228 on which the key 226 is disposed. In some embodiment, providing a flat side on which the key 226 is disposed can provide for a smaller cross-sectional diameter of the keyed shaft 224, which can be beneficial in reducing an overall size of the embodiments depicted and discussed in relation to the present disclosure.

Figure 9B:
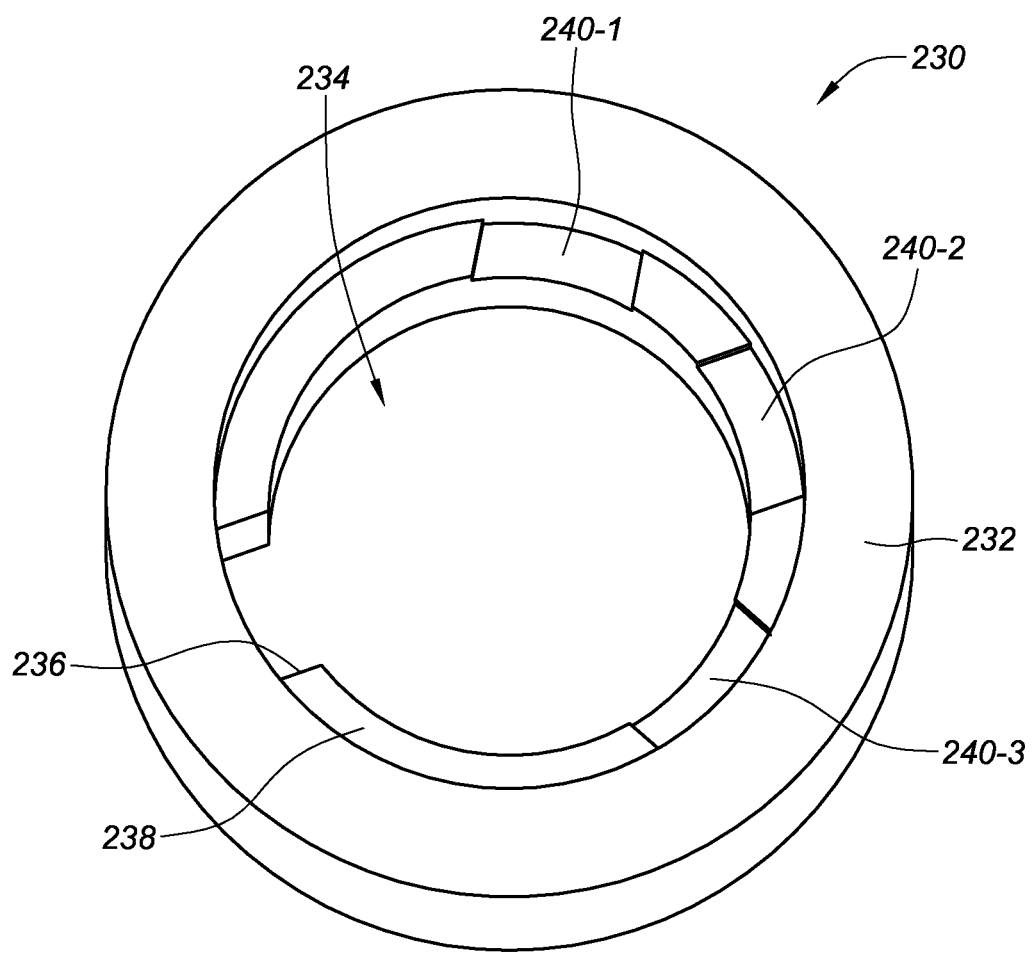
FIG. 9B depicts an asymmetric view of a keyed collar, in accordance with embodiments of the present disclosure.

FIG. 9B depicts an isometric view of a keyed collar 230, in accordance with embodiments of the present disclosure. In some embodiments, the keyed collar 230 can be an axially elongated tubular body 232 that defines a lumen 234, therethrough. In some embodiments, an axially extending keyed channel 236 can be defined in an interior wall of the axially elongated tubular body 232. The keyed collar 230 can be attached to a base of a beverage tap handle, as further discussed herein. The axially extending keyed channel 236 can be configured to accept the key 226 disposed on the keyed shaft 224. In some embodiments, the keyed collar 230 can further define a recessed lip 238, which in some embodiments can have an approximate radial depth such that it allows for the key 226 to rotate within the keyed collar 230. As depicted in FIG. 9B, a number of keyed slots 240-1, 240-2, 240-3 can be configured to accept the key 226. For example, the keyed shaft 224 can be inserted through the lumen 234, such that the key 226 corresponds with and passes through the keyed channel 236. The keyed shaft 224 can then be rotated such that the key 226 can be aligned with one of the keyed slots 240-1, 240-2, 240-3. Upon insertion of the key 226 into one of the keyed slots 240-1, 240-2, 240-3, the keyed shaft 224 can be locked into confirmation with the keyed collar, as further discussed herein.

Figure 9C:
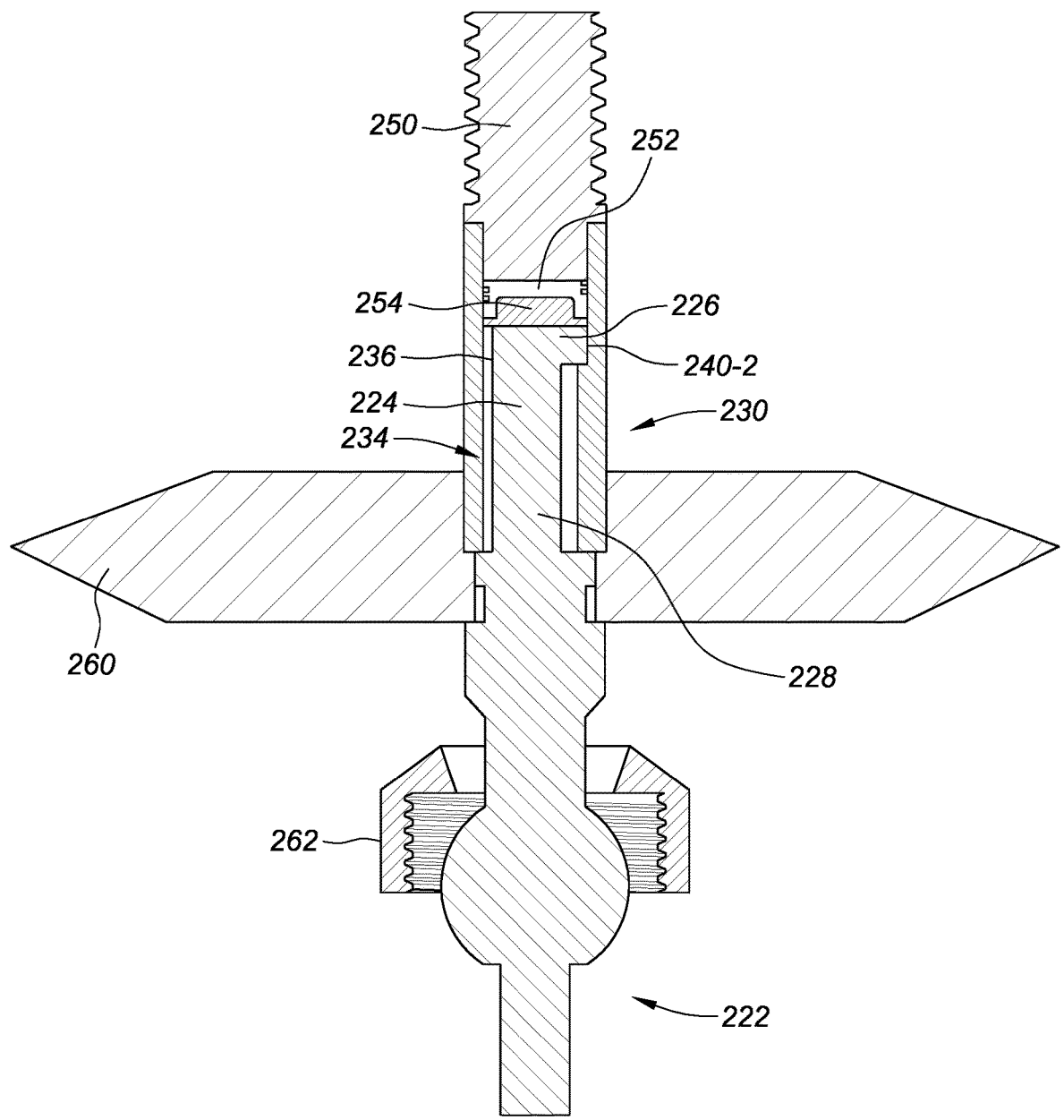
FIG. 9C is a cross-sectional view of the keyed shaft disposed within the keyed collar, in accordance with embodiments of the present disclosure.

FIG. 9C is a cross-sectional view of the keyed shaft 224 disposed within the keyed collar 230. As depicted, the keyed shaft 224 has been inserted into the lumen 234 defined by the keyed collar. For example, the key 226 can be inserted through the keyed channel 236, such that the key 226 extends past the recessed lip 238, allowing the keyed shaft 224 and the key 226 to be rotated with respect to the keyed collar 230, such that the key 226 can be aligned with one of the keyed slots 240, which is depicted as keyed slot 240-2, in FIG. 9C.

In some embodiments, a threaded portion 250 can be connected to a proximal end of the keyed collar 230, for connection with a correspondingly threaded portion of a beverage tap handle. In some embodiments, a spring 252 and retaining plate 254 can be disposed between a distal end of the threaded portion 250 and the recessed lip 238. In some embodiments, the retaining plate 254 can have a diameter that is sized correspondingly to a diameter of the recessed lip 238. In some embodiments, the spring 252 can provide a distal force against the retaining plate 254, causing a distal face of the retaining plate 254 to contact the recessed lip 238.

In operation, the proximal end of the keyed shaft 224 can be inserted into the lumen 234, such that the proximal end contacts the distal face of the retaining plate 254, causing the retaining plate 254 to exert an upward force against the spring 252. The spring 252 can be compressed to a point were the key 226 extends proximally past the recessed lip 238, allowing for rotation of the key 226 with respect to the keyed collar 230, such that the key 226 can be aligned with one of the keyed slots 240, which in this example is the keyed slot 240-2. When aligned with the keyed slot 240-2, the spring can provide a downward force, locking the key 226 into the keyed slot 240-2, preventing unintentional rotation and/or removal of the beverage tap handle. To remove the beverage tap handle, a user can infer a downward (distally directed) force on the beverage tap handle, causing the key 226 to become unseated from the keyed slot 240-2, such that the key 226 can be rotated and aligned with the keyed channel 236; thus allowing for detachment of the beverage tap handle from a tap assembly.

As depicted in FIG. 9B, three keyed slots are depicted, however, fewer or greater than three keyed slots can be included in embodiments of the present disclosure. In some embodiments, the beverage tap handle can be rotated, such that the beverage tap handle is disposed in one of the keyed slots. This can help correct an alignment of the beverage tap handle such that branding included on the beverage tap handle faces a correct direction. In some embodiments, one radially elongated slot can be included in the keyed collar 230, such that the beverage tap handle can be rotated to a certain degree without having to be disposed in a particular keyed slot.

In some embodiments, the keyed collar 230 can extend into a branding wheel 260, which can provide additional lateral support to the collar 230 and the attached beverage tap handle. In some embodiments, not depicted, a distal end of the keyed collar 230 can abut a proximal surface of the branding wheel 260.

Figure 9D:
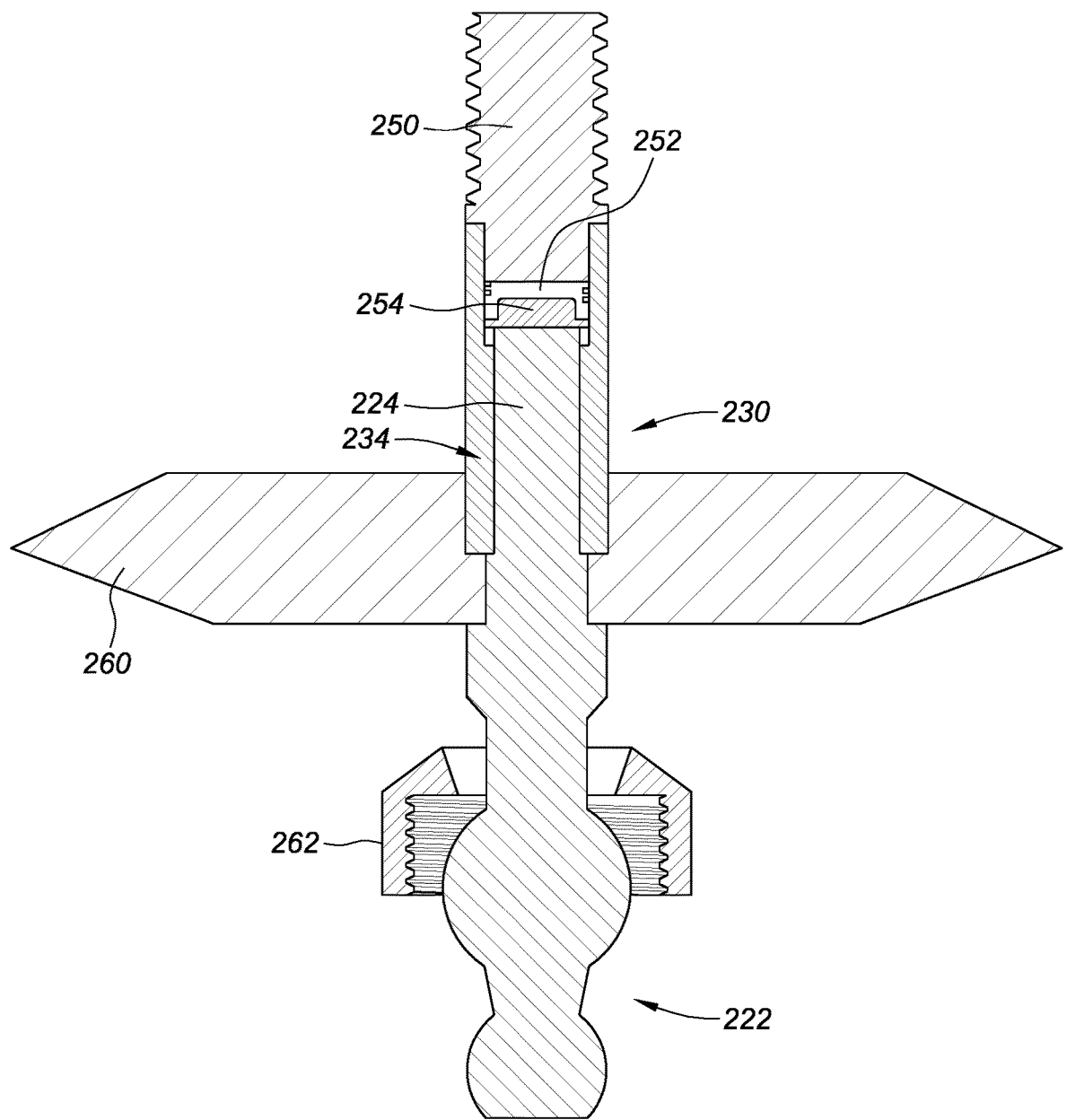
FIG. 9D is a cross-sectional view of the keyed shaft disposed within the keyed collar, as depicted in FIG. 9C, but rotated 90 degrees about its longitudinal axis, in accordance with embodiments of the present disclosure.

FIG. 9D is a cross-sectional view of the keyed shaft 224 disposed within the keyed collar 230, as depicted in FIG. 9C, but rotated 90 degrees about its longitudinal axis, in accordance with embodiments of the present disclosure. As depicted, a tap handle can be actuated from left to right or right to left with respect to the page, thus, moving the threaded portion 250, the keyed collar 234, the keyed shaft 224 and thus the faucet body 222 from left to right, allowing for activation of a beverage tap assembly. As depicted, the left and right side of the keyed shaft 224 can be engaged with either side of the keyed coupler, allowing for increased strength when actuating an attached beverage tap handle. In this configuration, the key 226 can extend perpendicular to a motion of the attached beverage tap handle.

Figure 10A:
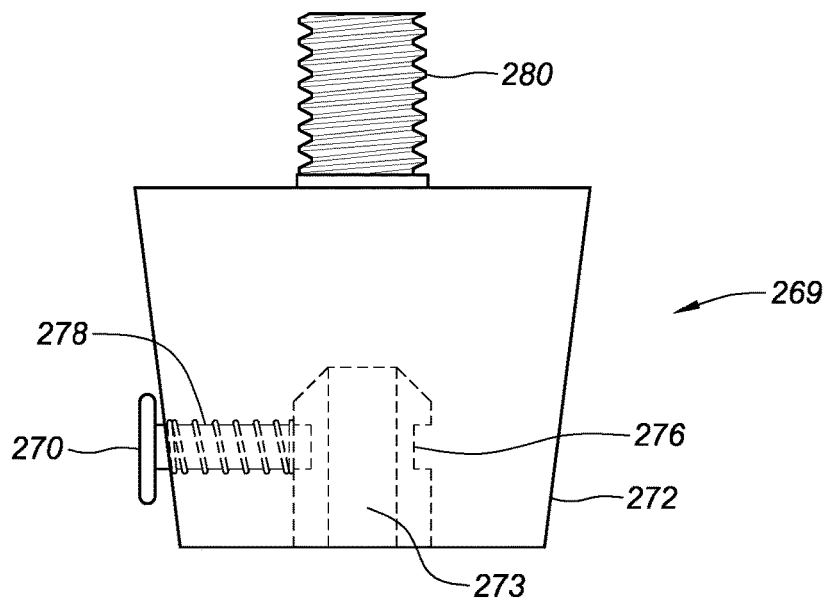
FIG. 10A is a cross-sectional view of a quick release beverage dispenser that includes a pull pin for a retaining feature, in accordance with embodiments of the present disclosure.
Figure 10B:
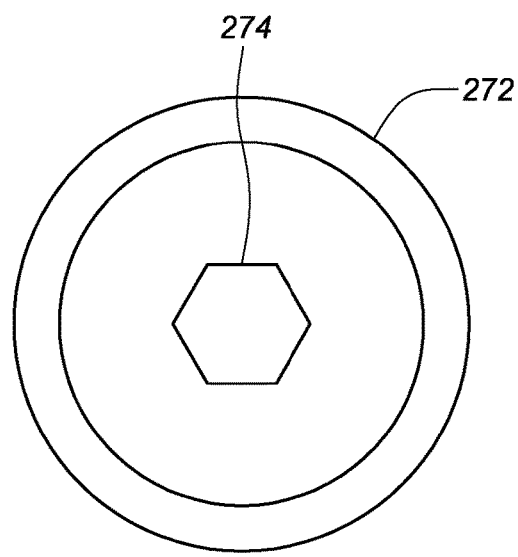
FIG. 10B is a bottom view of a keyed female portion of the quick release beverage dispenser depicted in FIG. 10A, in accordance with embodiments of the present disclosure.
Figure 10C:
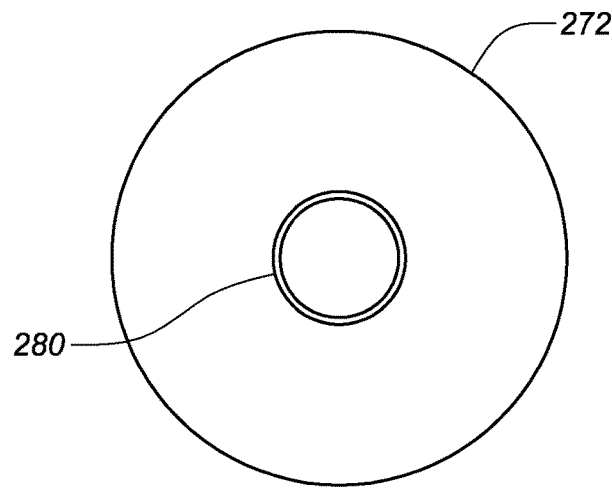
FIG. 10C is a top view of the keyed male portion of the quick release beverage dispenser depicted in FIG. 10A, in accordance with embodiments of the present disclosure.

FIG. 10A is a cross-sectional view of a quick release beverage dispenser 269 that includes a pull pin 270 for a retaining feature 270, in accordance with embodiments of the present disclosure. FIG. 10B is a bottom view of a keyed female portion 272 of the quick release beverage dispenser 269 depicted in FIG. 10A, in accordance with embodiments of the present disclosure. FIG. 10C is a top view of the keyed male portion 273 of the quick release beverage dispenser 269 depicted in FIG. 10A, in accordance with embodiments of the present disclosure.

In some embodiments, the quick release beverage dispenser 269 can include a keyed male portion 273 and a keyed female portion 272, as discussed herein. As depicted in FIG. 10B, and similarly discussed herein, the female portion 272 can include a keyed lumen 274 into which the keyed male portion 273 can be inserted. In some embodiments, a groove 276 can be defined about a circumference of the keyed male portion 273, which can be configured to interact with the retaining feature 270. In some embodiments, a lumen can be defined through a sidewall of the keyed female portion 272, through which the retaining feature 270 can be disposed. The retaining feature can be coupled with a biasing element, which is depicted as a spring 278. In some embodiments, the biasing element can naturally bias the retaining feature 270, such that the retaining feature 270 is pushed towards a radial center of the keyed female portion 272, thus engaging the groove 276 and retaining the keyed male portion 273 in the keyed lumen 274 (FIG. 10B). Accordingly, a user can grasp the exposed part of the retaining feature 270, pulling outward and away from a radial center of the keyed female portion 272. The retaining feature 270 can be pulled until the retaining feature 270 disengages from the groove 276, allowing for the keyed male portion 273 to be axially pulled from the keyed female portion 272. In some embodiments, an attachment portion 280 can be disposed on the keyed female portion 272, as depicted. In some embodiments the attachment portion 280 can be threaded.

Figure 11:
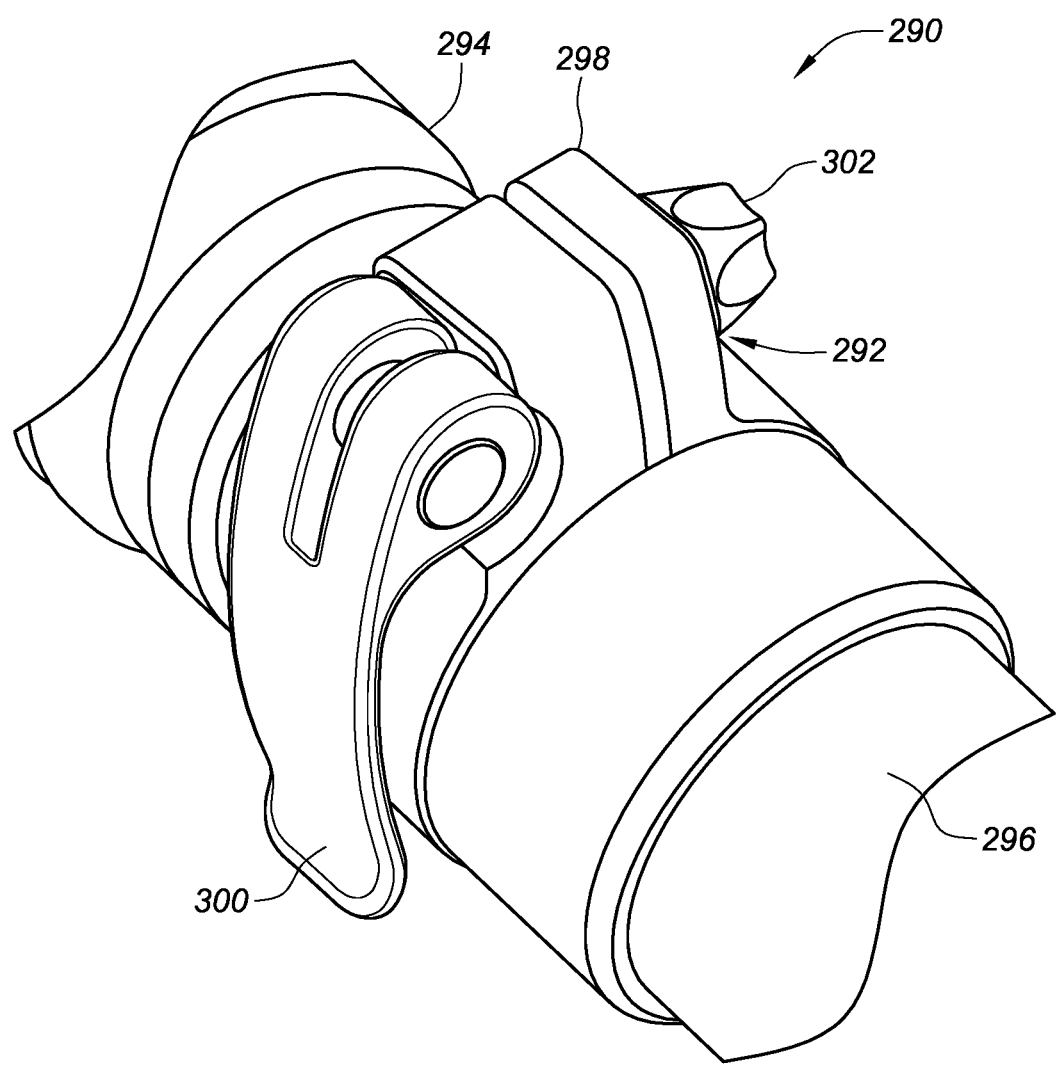
FIG. 11 is an isometric side view of another embodiment of a quick release beverage dispenser, in accordance with embodiments of the present disclosure.

FIG. 11 is an isometric side view of another embodiment of a quick release beverage dispenser 290, in accordance with embodiments of the present disclosure. In some embodiments, the quick release beverage dispenser 290 can include a clamp 292 disposed on a distal end of a tap handle 294. The clamp 292 can provide a clamping force against a shaft attached to a faucet lever 296. In some embodiments, the clamp 292 can be disposed on a proximal end of the faucet lever 296 and can provide a clamping force on the distal end of the tap handle 294. As depicted, the clamp 292 can include a clamping collar 298, upon which a clamping force can be provided by a cam 300 and associated shaft passing through the clamping collar 298, hidden from view. In some embodiments, a side of the shaft opposite the cam 300 can include an adjustment knob to adjust a tension associated with the clamp.

FIG. 12A is a side view of a quick release beverage dispenser 310 that includes a keyed male portion 312 and keyed female portion 314 in a locked position, in accordance with embodiments of the present disclosure. In some embodiments, the keyed female portion 314 can be attached to a distal end of a shaft 316, a proximal side of which includes threads 318. In some embodiments, the shaft 316 can be inserted and/or threaded into a distal end of a tap handle. The keyed male portion 312, better depicted in FIG. 12B can be inserted into a keyed lumen defined in a distal end of the keyed female portion 314, as further discussed herein. In some embodiments, the keyed male portion 312 can be attached to a proximal end of a faucet shaft 320. In some embodiments, the keyed male portion 312 can be hexagonal in shape, along its cross section, as discussed herein. Although the cross section is discussed as being hexagonal in shape, the cross section can be any keyed shape. In some embodiments, the faucet shaft 320 can be connected to a threaded portion 324 of a faucet body 326 via a correspondingly threaded bonnet 322, through which the faucet shaft 118 is disposed, as depicted in FIG. 1A.

In some embodiments, the keyed female portion 314 can include a collar 330 disposed about a barrel 328. The collar 330 can be naturally biased in a position such as that depicted in FIG. 12A, via a spring. In some embodiments, similarly to what is discussed herein with respect to FIGS. 1A to 6B, in the naturally biased position depicted in FIG. 12A, the collar can engage a number of retaining features (e.g., ball bearings) and/or cause the number of retaining features to be engaged, such that the retaining features are pushed toward a radial center of the keyed female portion 314. In some embodiments where the keyed female portion 314 is engaged with the keyed male portion 312, the retaining features can be disposed in a groove 332 circumferentially defined in an exterior surface of the keyed male portion 312.

As depicted in FIG. 12A, the keyed female portion 314 is in a locked position where the collar 330 is in a naturally biased state, which engages the retaining features. To unlock the keyed female portion 314, the collar 330 can be proximally lifted, such that it is in a position depicted in FIG. 12B.

In the embodiments depicted in FIG. 12B, the retaining features can be free to be pushed radially outward, allowing for the proximal end of the keyed male portion 312 (e.g., the portion disposed proximally from the groove 332) to slide past the retaining features and allowing for the keyed female portion 314 to be disengaged from the keyed male portion 312.

Some embodiments of the present disclosure can include a number of washers disposed between the keyed female portion 314 and the tap handle. For example, in some embodiments, the keyed female portion 314 can be timed to the tap handle, such that upon installation of the keyed female portion 314, a proper side of the tap handle faces a user. For example, it can be beneficial to have the tap handle face a user so they can tell what kind of beverage the tap handle is associated with. In some embodiments, a number of washers can be included with the keyed female portion 314, such that washers can be stacked on top of one another on the threaded portion 318 to allow the tap handle to face a particular direction when tightened to the keyed female portion 314 (e.g., timing of the tap handle). In some embodiments, the washers can be of different thicknesses. By inserting a number of and/or different thicknesses of washers over the threaded portion 318 of the shaft 316, the tap handle can have a different rotation when tightened, dependent on the thickness associated with the washer(s). While a hexagonally keyed male portion 312 may allow for 60 degrees of rotation at a time, the tap handle may be rotated to a position that is not sufficiently in line with a user for them to see. Furthermore, it may be desirable to have all tap handles on a tower perfectly aligned with one another, which can be accomplished by timing each individual tap handle with washers.

In some embodiments, although not depicted, a threaded collar can be disposed on the threaded portion 318. Accordingly, a tap handle can be screwed onto the threaded portion 318 and adjusted so it has a proper orientation. The threaded collar can then be tightened against a distal end of the tap handle, locking the tap handle in place with respect to the keyed female portion 314. As discussed in relation to washers for timing the tap handle, the tap handle can also be timed through the inclusion of a threaded collar disposed on the threaded portion 318.

Embodiments are described herein of various apparatuses, systems, and/or methods. Numerous specific details are set forth to provide a thorough understanding of the overall structure, function, manufacture, and use of the embodiments as described in the specification and depicted in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the user. It will be further appreciated that for conciseness and clarity, spatial terms such as "vertical," "horizontal," "up," and "down" may be used herein with respect to the illustrated embodiments. However, embodiments of the present disclosure may be used in many orientations and positions, and these terms are not intended to be limiting and absolute.

Although at least one embodiment for a quick release beverage dispenser with keyed coupler has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed:
1. A beverage dispenser, comprising:
   a tap handle;
   a faucet that includes a faucet lever, wherein:
      the tap handle is configured to be coupled to the faucet lever via a quick release keyed coupler; and the quick release keyed coupler is configured to prevent rotation of the tap handle with respect to the faucet, wherein the quick release keyed coupler includes a collar configured to be moved along a longitudinal axis to selectively engage a retaining feature, wherein the collar includes a collar base disposed at a distal end of the collar, a retaining spring and a retaining spring head coupled to a proximal end of the retaining spring, the retaining spring attached to and extending proximally from the collar base, wherein the retaining spring and the retaining spring head are configured to be moved along the longitudinal axis in conjunction with the collar and the collar base, the retaining spring head further configured to contact a retaining ball thereby retaining the tap handle with respect to the faucet lever, the retaining feature including the retaining ball.

2. The beverage dispenser of claim 1, wherein the quick release keyed coupler further comprises a male portion and a female portion.

3. The beverage dispenser of claim 2, wherein the male portion is attached to the tap handle.

4. The beverage dispenser of claim 3, wherein the female portion is attached to the faucet lever.

5. The beverage dispenser of claim 2, wherein the male portion is attached to the faucet lever and the female portion is attached to the tap handle.

6. The beverage dispenser of claim 2, wherein an outer profile shape of the male portion corresponds to an inner profile shape of the female portion.

7. The beverage dispenser of claim 6, wherein contact between the outer profile shape of the male portion and the inner profile shape of the female portion prevents rotation of the tap handle with respect to the faucet, as a result of their corresponding profile shapes.

8. The beverage dispenser of claim 2, wherein:
the male portion includes a number of male faces defined about an outer profile shape of the male portion;
the female portion includes a number of corresponding female faces; and
contact between the male faces and corresponding female faces prevents rotation between the male portion and the female portion.

9. The beverage dispenser of claim 8, wherein the number of corresponding male and female faces ranges from 3 to 10.

10. The beverage dispenser of claim 2, wherein the male portion includes a groove configured to interact with the retaining feature disposed in the female portion.

11. The beverage dispenser of claim 10, wherein the male portion and the female portion are disposed about the longitudinal axis when coupled with one another.

12. A beverage dispenser, comprising:
a tap handle;
a faucet that includes a faucet lever;
a quick release coupler disposed between the tap handle and the faucet lever, the quick release coupler including a coupler proximal end and a coupler distal end, with a central longitudinal axis defined between the coupler proximal end and the coupler distal end, wherein:
the quick release coupler includes a male portion and a female portion, each extending along the same central longitudinal axis,
the male portion is connected to a distal end of the tap handle, and
the female portion is connected to a proximal end of the faucet lever, wherein the male portion and the female portion each include correspondingly keyed features; and
the female portion includes a collar configured to be moved along the longitudinal axis to selectively engage a retaining feature, wherein the collar includes a collar base disposed at a distal end of the collar, a retaining spring and a retaining spring head coupled to a proximal end of the retaining spring, the retaining spring attached to and extending proximally from the collar base, wherein the retaining spring and the retaining spring head are configured to be moved along the longitudinal axis in conjunction with the collar and the collar base, the retaining spring head extending from the retaining spring, toward the central longitudinal axis, the retaining spring head further configured to contact a retaining ball thereby retaining the tap handle with respect to the faucet lever, the retaining feature including the retaining ball.

13. The beverage dispenser of claim 12, wherein the correspondingly keyed features prevent rotation of the tap handle with respect to the faucet lever.

14. The beverage dispenser of claim 13, wherein the retaining feature retains the male portion within the female portion.

15. The beverage dispenser of claim 12, wherein the quick release coupler further comprises a base portion disposed about the central longitudinal axis and distally from the collar base, wherein the base portion includes:
a tubular structure that extends proximally from the base portion about the central longitudinal axis and through a center of the collar and collar base, the tubular structure including a circumferentially extending slot defined at a proximal end of the tubular structure;
a retaining washer disposed at the proximal end of the tubular structure and affixed to the tubular structure via a retaining ring disposed in the circumferentially extending slot.

16. The beverage dispenser of claim 15, wherein the base portion includes a base ramp extending from a proximal side of the base portion and first and second support walls extending proximally from the base portion on either side of the base ramp, wherein the retaining washer includes a top ramp extending distally from a distal side of the retaining washer, the top ramp configured to be disposed between the first and second support walls, thereby retaining the retaining ball in conjunction with the first and second support walls, the base ramp, and the retaining spring head.

* * * * *